(12) United States Patent
John et al.

(10) Patent No.: US 10,104,706 B2
(45) Date of Patent: Oct. 16, 2018

(54) APPARATUS FOR ROLE IDENTIFICATION AND POWER SUPPLY CONTROL IN A WIRELESS TUNNELING SYSTEM

(71) Applicant: Lattice Semiconductor Corporation, Portland, OR (US)

(72) Inventors: Brian Henry John, San Jose, CA (US); Nishit Kumar, San Jose, CA (US); Ron Zeng, Saratoga, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 82 days.

(21) Appl. No.: 15/072,786

(22) Filed: Mar. 17, 2016

(65) Prior Publication Data

US 2016/0277994 A1 Sep. 22, 2016

Related U.S. Application Data

(60) Provisional application No. 62/135,007, filed on Mar. 18, 2015.

(51) Int. Cl.
*H04W 76/12* (2018.01)
*G06F 1/32* (2006.01)
(Continued)

(52) U.S. Cl.
CPC .............. *H04W 76/12* (2018.02); *G06F 1/26* (2013.01); *G06F 1/3278* (2013.01);
(Continued)

(58) Field of Classification Search
None
See application file for complete search history.

(56) References Cited

U.S. PATENT DOCUMENTS

2005/0027889 A1    2/2005   Sandulescu
2005/0138229 A1    6/2005   Sartore
(Continued)

FOREIGN PATENT DOCUMENTS

WO    WO 2010/090732 A1    8/2010

OTHER PUBLICATIONS

PCT International Search Report and Written Opinion, PCT Application No. PCT/US2016/023220, dated Jun. 28, 2016, 16 pages.
(Continued)

*Primary Examiner* — Charles C Jiang
*Assistant Examiner* — Saad Khawar
(74) *Attorney, Agent, or Firm* — Fenwick & West LLP

(57) ABSTRACT

A disclosed wireless tunneling system determines a suitable configuration of a wireless tunneling apparatus for tunneling communications between two processing apparatuses through a wireless link. Responsive to determining the configuration of the wireless tunneling apparatus, the wireless tunneling system establishes a communication with another wireless tunneling apparatus through the wireless link, while maintaining compliance of the communications between the two processing apparatuses with a wired communication protocol. Moreover, the wireless tunneling apparatus can supply power to or source power from a processing apparatus coupled to the wireless tunneling apparatus through a wired cable.

20 Claims, 9 Drawing Sheets

(51) Int. Cl.
*G06F 1/26* (2006.01)
*H04L 12/24* (2006.01)
*H04W 40/10* (2009.01)
*H04L 12/46* (2006.01)
*H04W 76/02* (2009.01)

(52) U.S. Cl.
CPC ...... *H04L 12/4633* (2013.01); *H04L 41/0873* (2013.01); *H04W 40/10* (2013.01); *H04W 76/022* (2013.01); *Y02B 60/126* (2013.01); *Y02B 60/50* (2013.01); *Y02D 10/157* (2018.01); *Y02D 70/00* (2018.01)

(56) References Cited

U.S. PATENT DOCUMENTS

| | | |
|---|---|---|
| 2008/0205417 A1 | 8/2008 | Li |
| 2008/0215773 A1 | 9/2008 | Christison et al. |
| 2010/0169523 A1* | 7/2010 | Dunstan ............... G06F 13/385 710/104 |
| 2011/0087903 A1 | 4/2011 | MacDougall et al. |
| 2011/0205444 A1 | 8/2011 | Yamamoto et al. |
| 2011/0317595 A1 | 12/2011 | Kanda et al. |
| 2013/0007324 A1 | 1/2013 | Moore et al. |
| 2013/0010849 A1 | 1/2013 | Shimizu et al. |
| 2013/0051440 A1* | 2/2013 | Rofougaran ......... H04B 7/0871 375/219 |
| 2013/0124762 A1 | 5/2013 | Tamir et al. |
| 2013/0287077 A1 | 10/2013 | Fernando et al. |
| 2014/0040486 A1 | 2/2014 | Christie |
| 2014/0122752 A1* | 5/2014 | Toivanen ............... H04L 69/22 710/63 |
| 2014/0219191 A1 | 8/2014 | Stephens et al. |
| 2016/0190996 A1 | 6/2016 | Searle |
| 2016/0198410 A1 | 7/2016 | Cherniaysky et al. |
| 2016/0216757 A1* | 7/2016 | Kim ..................... G06F 1/3287 |
| 2016/0278013 A1 | 9/2016 | Shellhammer et al. |
| 2016/0334837 A1 | 11/2016 | Dees et al. |
| 2017/0111866 A1 | 4/2017 | Park et al. |

OTHER PUBLICATIONS

PCT International Search Report and Written Opinion, PCT Application No. PCT/US2016/023199, dated Jul. 8, 2016, 11 pages.

\* cited by examiner

APPARATUS FOR ROLE IDENTIFICATION AND POWER SUPPLY CONTROL IN A WIRELESS TUNNELING SYSTEM

CROSS-REFERENCE TO RELATED APPLICATION

This application claims priority under 35 U.S.C. § 119(e) from U.S. Provisional Patent Application No. 62/135,007, entitled "Wireless Tunneling System" filed on Mar. 18, 2015, which is incorporated by reference herein in its entirety.

BACKGROUND

1. Field of the Disclosure

Embodiments of the present disclosure generally relate to the field of wireless communication and, more particularly, to role identification and power supply control of apparatuses in a wireless tunneling system.

2. Description of the Related Art

In various wired communication systems, connected apparatuses operate asymmetrically in upstream-downstream pairs. In one example, an upstream apparatus generally has the role to control the data flow communicated between the upstream apparatus and a downstream apparatus. Additionally, the upstream apparatus provides power or controls the power to the downstream apparatus. In such a wired communication system, when the configurations of the two apparatuses are incompatible or the configuration of at least one apparatus is undetermined, the two apparatuses may not successfully establish or maintain a connection.

A wireless tunneling system enables data that are traditionally communicated over a wired communication link to be tunneled through a wireless channel at low latency. In such a wireless tunneling system, a challenge exists in determining whether each wireless apparatus is coupled to an upstream or downstream apparatus in the context of the tunneled connection, and how the wireless apparatuses should therefore operate to establish and maintain proper communication and provide power management between the connected apparatuses.

SUMMARY

A disclosed wireless tunneling system determines a suitable configuration of a wireless tunneling apparatus for tunneling communications between two processing apparatuses through a wireless link. Responsive to determining the configuration of the wireless tunneling apparatus, the wireless tunneling apparatus coupled to a processing apparatus establishes a communication with another wireless tunneling apparatus coupled to another processing apparatus through the wireless link, while maintaining compliance of the communications between the two processing apparatuses with a wired communication protocol. Moreover, the wireless tunneling apparatus can supply power to or source power from the processing apparatus coupled to the wireless tunneling apparatus through a wired connection (e.g., cable or trace).

In one embodiment, the wireless tunneling system includes two wireless tunneling apparatuses that communicate with each other through the wireless link. A local wireless tunneling apparatus is coupled to a local processing apparatus through a wired connection and a remote wireless tunneling apparatus is coupled to the remote processing apparatus through another wired connection. The two processing apparatuses may communicate with each other through the wireless link using the two wireless tunneling apparatuses as if the two processing apparatuses were connected through a wired connection.

In one embodiment, the local wireless tunneling apparatus includes a wireless receiver, a state machine, and a power supply unit. The wireless receiver is configured to receive a wireless receive signal from the remote wireless tunneling apparatus, and to downconvert the wireless receive signal to generate a baseband receive signal. The state machine is configured to receive a local identification signal indicating an initial local configuration of the local wireless tunneling apparatus through a wired connection, wherein the initial local configuration comprises one of (i) an upstream apparatus configuration, (ii) a downstream apparatus configuration, and (iii) an undetermined configuration. The state machine is further configured to identify a remote identification signal in the baseband receive signal indicating an initial remote configuration of the remote wireless tunneling apparatus. Moreover, the state machine is further configured to determine a resolved local configuration of the local wireless tunneling apparatus based on the initial local configuration of the local wireless tunneling apparatus and the initial remote configuration of the remote wireless tunneling apparatus. The power supply unit is configured to provide output power to the local processing apparatus responsive to determining that the resolved local configuration of the local wireless tunneling apparatus is the downstream apparatus configuration, and to receive input power from the local processing apparatus responsive to determining that the resolved configuration of the local wireless tunneling apparatus is the upstream apparatus configuration.

In one embodiment, the state machine is further configured to determine that a conflict exists between the initial remote configuration of the remote wireless tunneling apparatus and the initial local configuration of the local wireless tunneling apparatus responsive to determining that the initial remote configuration of the remote wireless tunneling apparatus and the initial local configuration of the local wireless tunneling apparatus are both upstream apparatus configurations, both downstream apparatus configurations, or both undetermined configurations.

In one embodiment, the state machine is further configured to disable the wireless receiver responsive to determining that the conflict exists between the initial remote configuration of the remote wireless tunneling apparatus and the initial local configuration of the local wireless tunneling apparatus.

In one embodiment, responsive to determining that the conflict exists, the state machine is further configured to resolve the conflict by determining the resolved local configuration of the local wireless tunneling apparatus according to a package identification indicating a type of antenna coupled to the local wireless tunneling apparatus.

In one embodiment, wherein the state machine is further configured to determine the initial remote configuration of the remote wireless tunneling apparatus through a valid signal and the remote identification signal from the baseband receive signal, the valid signal indicating whether the identification signal is a valid indication of the initial remote configuration, and the remote identification signal indicating the initial remote configuration of the remote wireless tunneling apparatus responsive to the valid signal indicating the remote identification signal of the remote wireless tunneling apparatus is valid.

In one embodiment, the state machine is further configured to determine that the initial remote configuration of the remote wireless tunneling apparatus is undetermined responsive to the valid signal indicating the initial remote configuration of the remote wireless tunneling apparatus is not valid.

In one embodiment, responsive to determining that the initial local configuration of the local wireless tunneling apparatus is the undetermined configuration, the state machine is further configured to (i) determine that the resolved local configuration of the local wireless tunneling apparatus is the upstream apparatus configuration responsive to the initial remote configuration of the remote wireless tunneling apparatus being the downstream apparatus configuration, and (ii) determine that the resolved local configuration of the local wireless tunneling apparatus is the downstream apparatus configuration responsive to the initial remote configuration of the remote wireless tunneling apparatus being the upstream apparatus configuration.

In one embodiment, responsive to determining that the initial remote configuration of the remote wireless tunneling apparatus is the undetermined configuration the state machine is further configured to (i) determine that a resolved remote configuration of the remote wireless tunneling apparatus is the upstream apparatus configuration responsive to the initial local configuration of the local wireless tunneling apparatus being the downstream apparatus configuration, and (ii) determine that the resolved remote configuration of the remote wireless tunneling apparatus is the downstream apparatus configuration responsive to the initial local configuration of the local wireless tunneling apparatus being the upstream apparatus configuration.

In one embodiment, the local wireless tunneling apparatus further includes a wireless transmitter configured to transmit a wireless transmit signal indicating the initial local configuration of the local wireless tunneling apparatus to the remote wireless tunneling apparatus coupled to the remote processing apparatus. The wireless transmitter may be configured to transmit a wireless transmit signal indicating the resolved local configuration of the local wireless tunneling apparatus to the remote wireless tunneling apparatus coupled to the remote processing apparatus.

In one embodiment, the state machine is further configured to (i) determine that the local processing apparatus is coupled to the local wireless tunneling apparatus responsive to detecting the input power from the local processing apparatus, and (ii) determine that the local processing apparatus is decoupled from the local wireless tunneling apparatus responsive to not detecting the input power from the local processing apparatus.

In one embodiment, responsive to determining that the resolved local configuration of the local wireless tunneling apparatus is the upstream apparatus configuration and responsive to determining that the local processing apparatus is coupled to the local wireless tunneling apparatus, the state machine is further configured to cause the power supply unit to receive the input power from the local processing apparatus.

In one embodiment, responsive to determining that the resolved local configuration of the local wireless tunneling apparatus is the downstream apparatus configuration and responsive to determining that the local processing apparatus is coupled to the local wireless tunneling apparatus, the state machine is further configured to cause the power supply unit to provide the output power to the local processing apparatus.

BRIEF DESCRIPTION OF THE DRAWINGS

The teachings of the embodiments disclosed herein can be readily understood by considering the following detailed description in conjunction with the accompanying drawings.

DETAILED DESCRIPTION

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIG.) and the following description relate to the preferred embodiments by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Embodiments herein are primarily described in the context of a tunneling system that can be plugged into an arbitrary node in a connected topology, comprising hosts, devices, and hubs. In some embodiments, the wireless tunneling may operate in the context of a USB 3.0 system. However, the embodiments herein may also be used to communicate using other communication protocols such as different versions of the USB standard or entirely different protocols such as HDMI, DisplayPort, or other serial communication protocols.

Figure 1:
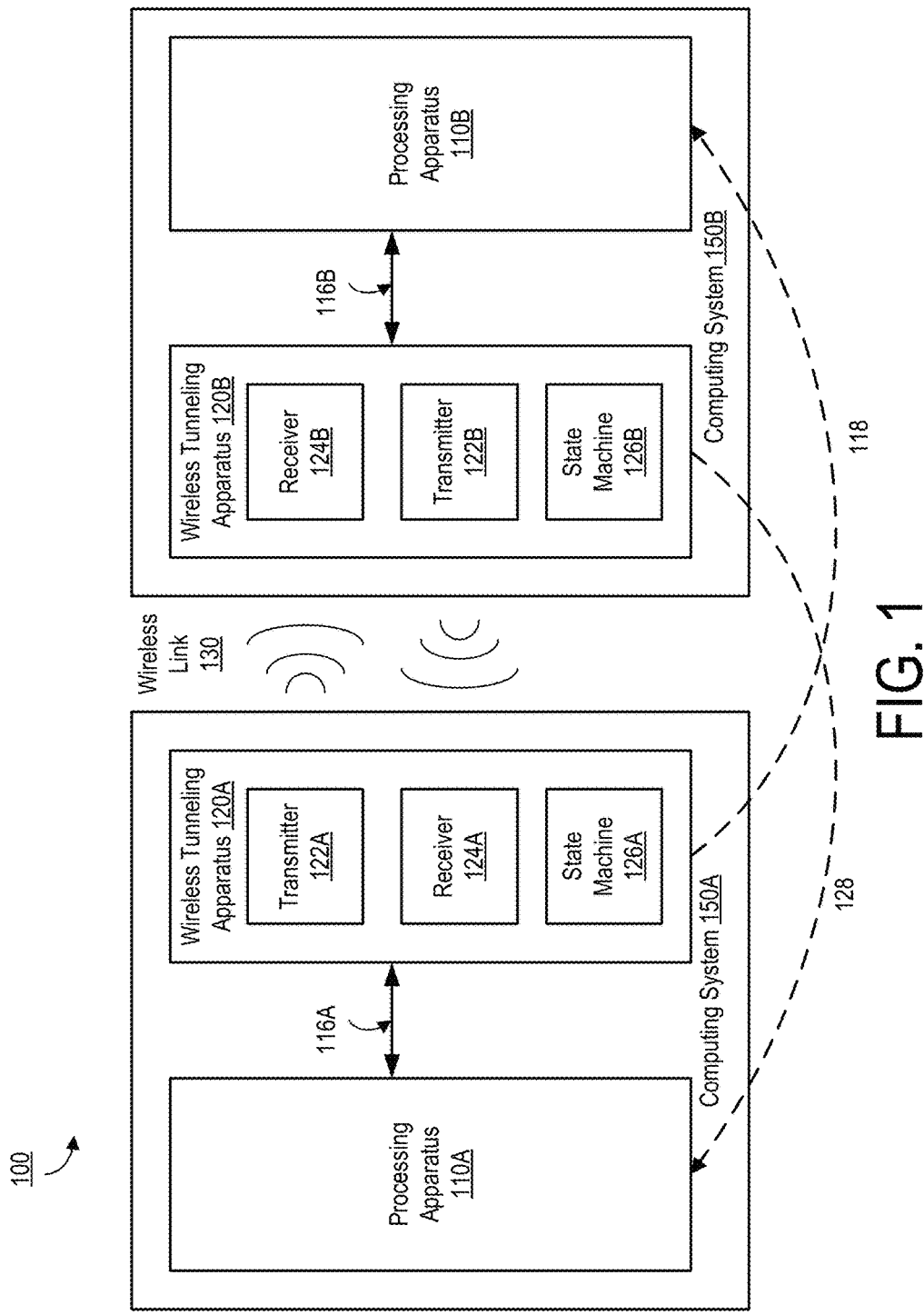
FIG. 1 illustrates one embodiment of a wireless tunneling system.

FIG. 1 illustrates an embodiment of a wireless tunneling system 100. The wireless tunneling system 100 comprises a first computing system 150A communicating with a second computing system 150B via a wireless link 130.

In one embodiment, the wireless link 130 comprises a 60 GHz wireless link. The wireless link 130 may be limited to short range communications where the wireless tunneling apparatuses 120 are in very close proximity to each other (e.g., within a few millimeters). Data transmissions over the wireless link 130 may have a data rate of, for example, 6 Gigabits per second or higher. In other embodiments, the wireless link may be suitable for a long range communications and/or implemented for other frequency bands.

The first computing system 150A includes a processing apparatus 110A coupled to a wireless tunneling apparatus 120A through a wired connection 116A, and the second computing system 150B includes a processing apparatus 110B coupled to a wireless tunneling apparatus 120B through a wired connection 116B. The wireless tunneling apparatuses 120A and 120B (herein also referred to as "wireless tunneling apparatuses 120" or "transceivers 120") communicate with each other through the wireless link 130, and tunnels communication between the processing apparatuses 110A and 110B (herein also referred to as "processing apparatuses 110" or "source apparatuses 110"). A processing apparatus can include an electronic apparatus able to exchange data (unidirectional or bidirectional) compliant with a wired communication protocol with another electronic apparatus. Examples of a processing apparatus include a source device, a sink device, an intermediate device between the source device and the sink device, USB host/device, a storage device, etc. In one embodiment, the wireless tunneling apparatus 120 is embodied as a removable dongle that can couple to a port of the processing apparatus 110 using a compliant port or cable (e.g., a USB port or cable, a HDMI port or cable, or a DisplayPort port or cable). In other embodiments, the wireless tunneling apparatus 120 is internally coupled to the processing apparatus 110 (e.g., via traces on a printed circuit board) or may be fully integrated with the processing apparatus 110 (e.g., in an integrated circuit).

The computing system 150 (and the components thereof) may be implemented using analog circuit components, digital logic, software, or a combination thereof. In one embodiment, one or more components of the computing system 150 may be implemented as a processor and a non-transitory computer-readable storage medium storing instructions that when executed by the processor cause the processor to carry out the functions attributed to the components. Alternatively, or in addition, digital components may be implemented as an application specific integrated circuit (ASIC), field-programmable gate array (FGPA), or using a combination of implementations.

In one embodiment, the wireless tunneling system 100 provides a replacement for conventional wired communications such as USB, HDMI, DisplayPort, or other serial communication protocols. For example, rather than the processing apparatuses 110A, 110B communicating directly to each other via a traditional cable, the processing apparatuses 110A, 110B instead communicate with their respective wireless tunneling apparatuses 120A, 120B, which then tunnel the data over a high-speed point-to-point serial wireless link 130 at speeds exceeding those that can be achieved using traditional wired communications.

From the perspective of the processing apparatuses 110A, 110B, the communications may be implemented in the same way as if the processing apparatuses 110, 110B were directly connected in a conventional configuration. Thus, no modification to a conventional processing apparatus 110A, 110B is necessarily required (e.g., no software modification is necessary). In other words, the wireless tunneling apparatuses 120A, 120B and the wireless link 130 between them may operate as a direct replacement for a conventional cable. For example, each wireless tunneling apparatus 120A, 120B includes an interface that enables it to plug directly into a conventional cable interface of its respective processing apparatus 110A, 110B and the wireless tunneling apparatuses 120A, 120B facilitate communication such that it appears to the processing apparatuses 110A, 110B that they are directly connected. In alternative embodiments, the wireless tunneling apparatuses 120A, 120B may be integrated with their respective processing apparatuses 110A, 110B.

Taking USB as an example, traditional wireless apparatuses with USB interface terminate the USB protocol in the wireless tunneling apparatus and re-encode data into a different wireless protocol for transmission. These traditional wireless apparatuses are visible as nodes (USB hubs, USB devices or USB repeaters) in the USB tree topology. In contrast, a USB wireless tunneling apparatus allows for USB link-layer data traffic to be transmitted without modifications at very low latency and without terminating the USB protocol layers. Hence, such tunneling apparatuses are not visible in the USB topology.

In one embodiment, each wireless tunneling apparatus 120 communicates with its connected processing apparatus 110 to mirror the states and operations of a counterpart of the processing apparatus 110 to which the wireless tunneling apparatus 120 is coupled. Thus, for example, the wireless tunneling apparatus 120A mirrors the states of the processing apparatus 110B as indicated by an arrow 118, and the wireless tunneling apparatus 120B mirrors the processing apparatus 110A as indicated by an arrow 128. Accordingly, the data communicated from the wireless tunneling apparatus 120A to the processing apparatus 110A mirror communications from the processing apparatus 110B to the wireless tunneling apparatus 120B, and data communicated from the wireless tunneling apparatus 120B to the processing apparatus 110B mirror communications from the processing apparatus 110A to the wireless tunneling apparatus 120A.

In typical systems (e.g., USB systems), a connection is established between two processing apparatuses 110 in which one apparatus 110A operates as an upstream apparatus and the other apparatus 110B operates as a downstream apparatus. Similarly, in the context of a particular connection, one wireless tunneling apparatus 120A operates as an upstream apparatus and the other wireless tunneling apparatus 120B operates as a downstream apparatus. At different times, an apparatus 110, 120 may switch between operating as an upstream apparatus and a downstream apparatus. The apparatus 110, 120 could be inserted into any part of the USB connection tree topology. Taking USB as an example, the wireless tunneling apparatuses 120A and 120B could be inserted between "host" and "device", "upstream hub" and "device," "host" and "downstream hub," and "upstream hub" and "downstream hub." The USB protocol allows for up to 5 layers of "hubs" besides the "host" and "device." For proper tunneling, the configurations (e.g., upstream or downstream) of the two wireless tunneling apparatuses 120 must be compatible with (i.e., counterpart to) each other. Furthermore, in the terminology used herein, the configuration of the processing apparatus 110 and the configuration of the wireless tunneling apparatus 120 coupled to the processing apparatus 110 through the wired connection 116 are matched (i.e., same configuration).

In one embodiment, to enable proper communication, the wireless tunneling apparatuses 120 each determine whether the processing apparatus 110 to which they are respectively connected are operating as an upstream apparatus or downstream apparatus and then configure themselves accordingly to mirror the counterpart processing apparatus 110. In the case where a conflict arises between the respective configurations of the wireless tunneling apparatuses 120 (e.g., the configurations of both apparatuses are initially undetermined or the initial configurations are not counterpart to each other), the conflict may in some cases be resolved by assigning an appropriate configuration to each of the wireless tunneling apparatuses 120 as will be described further below.

The wireless tunneling apparatus 120 comprises a transmitter 122, a receiver 124, and a state machine 126. The transmitter 122 receives data from the processing apparatus 110 and transmits the data over the wireless link 130 to a receiver 124 of a different computing system 150. The receiver 124 receives data over the wireless link 130 from a transmitter 122 of another computing system 150 and provides the received data to the processing apparatus 110. The state machine 126 controls the power state of the wireless tunneling apparatus 120 by switching the wireless tunneling apparatus 120 between a high power state for transmitting high frequency data and one or more low power states as will be described in further detail below. The wireless tunneling apparatuses 120 furthermore mimic low-power states signaled within the tunneled protocol. In an embodiment, the wireless tunneling apparatus 120 is capable of full-duplex communication so that it may transmit and receive data over the wireless link 130 simultaneously.

For example, in the illustrated embodiment, the processing apparatus 110A is configured as an upstream apparatus and operates according to the state machine 126A as a "host" (or an "upstream hub") where the processing apparatus 110B is configured as a downstream apparatus and operates according to the state machine 126B as a "device" (or downstream hub). The processing apparatus 110A, functioning as the "host," controls operations of or communication with the processing apparatus 110B, functioning as the "device." The upstream wireless tunneling apparatus 120A interfaces the upstream processing apparatus 110A (or "host") through the wired connection 116A, and similarly the downstream wireless tunneling apparatus 120B interfaces the downstream processing apparatus 110B ("device") through the wired connection 116B. Thus, an indication of upstream/downstream configuration of the local processing apparatus 110A can also indicate the configuration of the wireless tunneling apparatus 120A, and vice versa. The wireless tunneling apparatuses 120A and 120B exchange data including status, states, or control information of respective processing apparatuses 110 over the wireless link 130.

In one embodiment, a wireless tunneling apparatus 120 of one configuration does not perform or replicate the operation of a local processing apparatus 110 of the same configuration, but rather performs or replicates the state and operation of a local processing apparatus 110 of the counterpart configuration. That is, the upstream wireless tunneling apparatus 120A interfacing the upstream processing apparatus 110A through the wired connection 116A mirrors the state and operation of the downstream processing apparatus 110B (e.g., in the context of a USB connection, the upstream wireless tunneling apparatus 120A mirrors a "device"), according to the state machine 126A. By the same token, the downstream wireless tunneling apparatus 120B interfacing the downstream processing apparatus 110B through the wired connection 116B mirrors the state and operation of the upstream processing apparatus 110A (e.g., in the context of a USB connection, the downstream wireless tunneling apparatus 120B mirrors a "host") according to the state machine 126B.

In one embodiment, the wireless tunneling apparatuses 120A, 120B are substantially identical apparatuses. Alternatively, the wireless tunneling apparatuses 120A, 120B are different complementary apparatus types that have similar high level architectures, but differ in certain architectural or operational characteristics as described herein. For example, in one embodiment, the first wireless tunneling apparatus 120A comprises first apparatus type configured to operate with a processing apparatus 110A embodied as a docking station, while the second wireless tunneling apparatus 120B comprises a second apparatus type configured to operate with a processing apparatus 110B embodied as a mobile apparatus. In one embodiment, in order to implement full-duplex communication, complementary wireless tunneling apparatuses 120 of different types have different antenna polarization so that two different transmitter/receiver antenna pairs can simultaneously operate in both directions. For example, the wireless tunneling apparatus 120A may have a type X transmit antenna and a type Y receive antenna, while the wireless tunneling apparatus 120B has a complementary type Y transmit antenna and a type X receive antenna. Furthermore, wireless tunneling apparatuses 120 of different types may operate according to different control schemes in order to optimize the power efficiency of one of the wireless tunneling apparatuses 120 in the pair. For example, when the first wireless tunneling apparatus 120A is configured for operating with a docking station and the second wireless tunneling apparatus 120B is configured for operating with a mobile apparatus, the wireless tunneling apparatuses 120A, 120B may operate asymmetrically in order to lower the power consumption of the wireless tunneling apparatus 120B hosted by the mobile apparatus at the expense of the wireless tunneling apparatus 120B hosted by the docking station. This tradeoff may be desirable because a docking station is typically connected to a continuous power source, while a mobile apparatus depends on a battery with limited power.

In one embodiment, the apparatus type associated with a wireless tunneling apparatus 120 (and the operation associated therewith) may be permanently designed into the wireless tunneling apparatus 120. Alternatively, a wireless tunneling apparatus 120 may be configurable between two or more apparatus types based on a switch, a control pin (i.e., control input of a chip), or register setting. Architectural and/or operational differences between the different configurations of the wireless tunneling apparatuses 120A, 120B in a complementary pair are described in further detail below.

Figure 2:
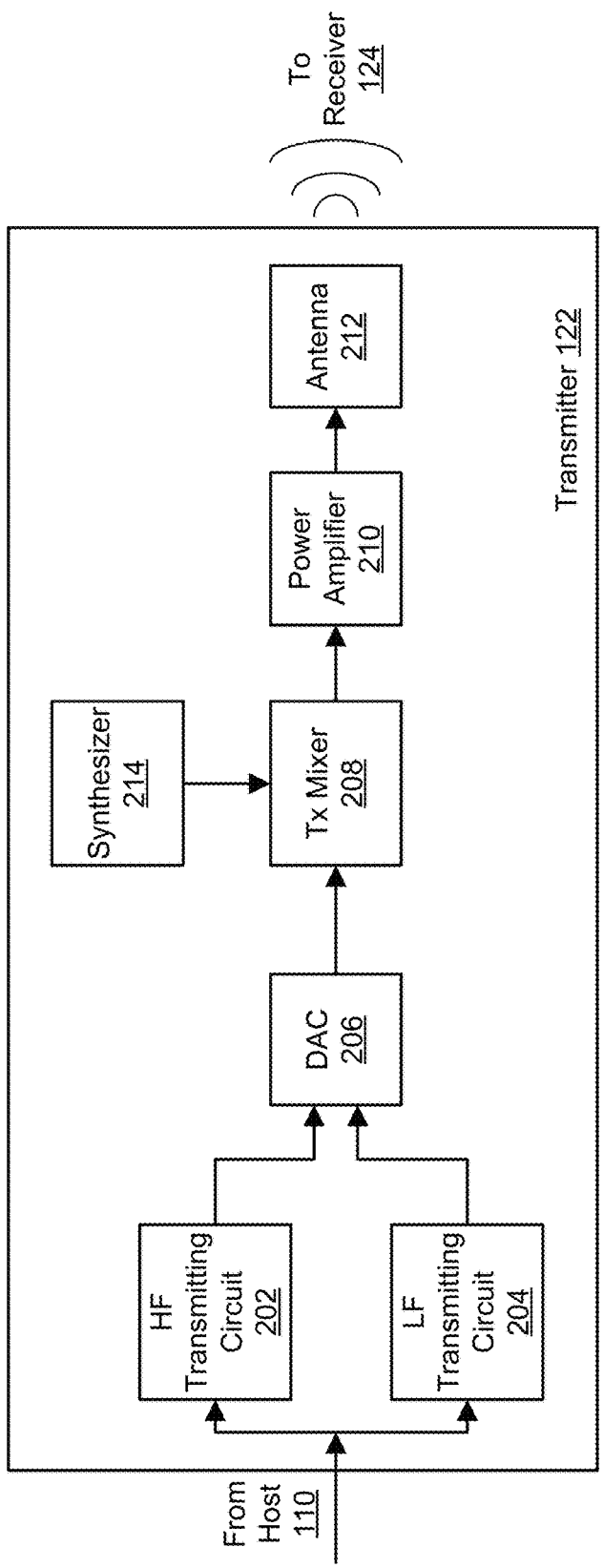
FIG. 2 illustrates an example embodiment of a transmitter of the wireless tunneling apparatus.

FIG. 2 illustrates an example embodiment of a transmitter 122 (e.g., transmitter 122a or transmitter 122b). The transmitter 122 includes a high frequency (HF) transmitting circuit 202, a low frequency (LF) transmitting circuit 204, and a shared transmit data path comprising a digital-to-analog converter (DAC) 206, a transmit (Tx) mixer 208 (herein also referred to as "an up-converter circuit"), a synthesizer 214, a power amplifier 210, and an antenna 212. A high frequency transmit data path comprises the HF transmitting circuit 202 and may operate together with or include the shared transmit data path. Similarly, a low frequency transmit data path comprises the LF transmitting circuit 204 and may operate together with or include the shared transmit data path.

The HF transmitting circuit 202 provides an interface with the processing apparatus 110 for receiving digital data, and generates a high data rate (e.g., 6 Gbps) digital baseband signal (herein also referred to as "a first baseband transmit signal"). For example, in one embodiment, the HF transmitting circuit 202 receives serial data conforming to a USB protocol, an HDMI protocol, a DisplayPort protocol, or other communication protocol and generates a high-speed signal suitable for wireless transmission.

The LF transmitting circuit 204 generates a low data rate signal (herein also referred to as "a second baseband transmit signal") that has a substantially lower data rate than the high data rate signal produced by the HF transmitting circuit 202. The low data rate signal typically comprises control signals used to communicate control or state information such as, for example, information for operating in or transitioning between a proximity detection state or an apparatus attachment/detachment state, and other state information used for controlling the power state of the wireless tunneling apparatus 120.

The digital-to-analog converter 206 converts the high speed and low speed signals from the HF transmitting circuit 202 and LF transmitting circuit 204 respectively from the digital domain to the analog domain to generate an analog baseband signal. The Tx mixer 208 up-converts the analog baseband signal to a radio frequency signal based on a carrier signal (generated by the synthesizer 214) to generate an up-converted signal. The power amplifier 210 amplifies the up-converted signal to generate an amplified signal (herein also referred to as "a wireless transmit signal") transmitted by the antenna 212 over the wireless link 130. In one embodiment, the power amplifier 210 comprises a multi-stage power amplifier that amplifies the up-converted signal in a manner that meets output power and linearity requirements. As described above, the antenna 212 may be of different type depending on whether the transmitter 122 is a first apparatus type (e.g., for use with a wall-powered dock apparatus) or as second apparatus type (e.g., for use with a battery-powered mobile apparatus).

The state machine 126 controls the power state of the various components of the transmitter 122 depending on an operational state of the transmitter 122 in order to improve power efficiency of the transmitter 122. For example, because the power consumption of the HF transmitting circuit 202 is relatively high compared to the LF transmitting circuit 204, the state machine 126 can control the HF transmitting circuit 202 to operate in a low power state or turn off the HF transmitting circuit 202 during a low frequency transmission when the HF transmitting circuit 202 is not being used. During high frequency transmissions, the LF transmitting circuit 204 may be powered down. Furthermore even during proximity detection (as will be described later), since the LF transmitting circuit 204 transmit operations generally happen relatively infrequently, the state machine 126 can turn off power to the digital-to-analog converter 206, Tx mixer 208, synthesizer 214, and power amplifier 210 during periods when neither the HF transmitting circuit 202 nor the LF transmitting circuit 204 are operational. This duty-cycling of the transmit data path lends itself to lower power consumption when averaged over time.

Figure 3:
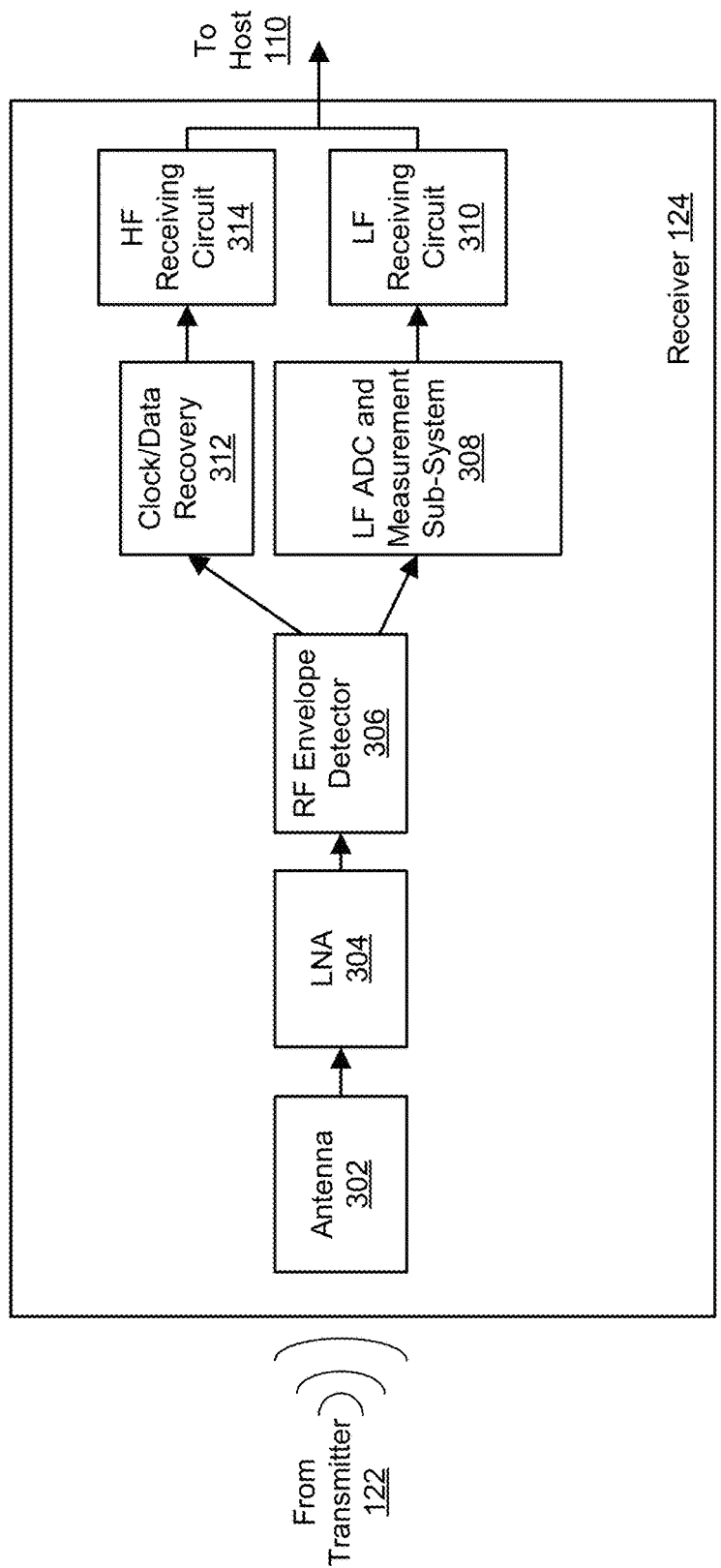
FIG. 3 illustrates an example embodiment of a receiver of the wireless tunneling apparatus.

FIG. 3 illustrates an example embodiment of a receiver 124 (e.g., receiver 124a or 124b). The receiver 124 includes a shared receive data path comprising an antenna 302, a low noise amplifier (LNA) 304, and a down-converter circuit (e.g., a radio frequency (RF) envelope detector 306); a high frequency receive data path including a clock/data recovery circuit 312 and a high frequency receiving circuit 314; and a low frequency receive data path including a low frequency analog-to-digital converter and measurement sub-system 308, and a low frequency receiving circuit 310. The high frequency receive data path may operate together with or include the shared receive data path. Similarly, the low frequency receive data path may operate together with or includes the shared receive data path.

The antenna 302 receives a wireless signal (herein also referred to as "a wireless receive signal") via the wireless link 130 which is amplified by the low noise amplifier 304. As described above, the antenna 302 may be of different type depending on whether the receiver 124 is a first apparatus type (e.g., for use with a dock apparatus) or as second apparatus type (e.g., for use with a mobile apparatus). The low noise amplifier 304 provides gain and incorporates automatic gain control to ensure an optimal signal level at the input of the RF envelope detector 306. The RF envelope detector 306 demodulates the amplified wireless signal (or amplified RF signal) by detecting an envelope of the amplified signal to recover a baseband signal (herein also referred to as "a baseband receive signal"). For example, in one embodiment, the RF envelope detector 306 applies a non-linear (e.g., square law) amplification to rectify the amplified RF signal, and then filters out the high-frequency components to provide the baseband signal.

In the high frequency receive data path, the clock/data recovery circuit 312 recovers a clock signal implicit in the baseband signal and uses the clock signal to recover high speed data. The HF receiving circuit 314 processes the high speed data signal and generates a signal (herein also referred to as "receive data") suitable for interfacing to the processing apparatus 110. For example, the HF receiving circuit 314 generates a data signal conforming to the USB protocol, HDMI protocol, DisplayPort protocol, or other data protocol associated with the processing apparatus 110.

In the low frequency receive data path, the LF ADC and measurement sub-system 308 converts the baseband signal to a digital representation and provides the digital signal to the LF receiving circuit 310. The LF receiving circuit 310 processes the digital signal to generate a signal representing control (herein also referred to as "a control signal" or "control information") for providing to the state machine 126 or status information for providing to the processing apparatus 110.

The state machine 126 controls the power state of the various components of the receiver 124 depending on an operational state of the receiver 124 in order to improve power efficiency of the receiver 124. For example, because the power consumption of the HF receiving circuit 314 is relatively high compared to the LF receiving circuit 310, the state machine 126 can control the HF receiving circuit 314 to operate in a low power state or turn off the HF receiving circuit 314 during a low frequency transmission when the HF receiving circuit 314 is not being used. Similarly, the clock/data recovery circuit 312 can be powered down during a low frequency transmission. During high frequency transmissions, the low frequency components such as LF receiving circuit 310 may be powered down.

The architecture of the low frequency receive data path is well suited for low power operation. In contrast to a conventional receive architecture, the receive data path of the receiver 124 does not include a synthesizer, which typically consumes substantial power in a traditional receiver architecture. Instead, the receiver 124 can recover both the low and high frequency transmissions based on envelope detection, thereby operating at significantly lower power than a traditional receiver. This low-power RF architecture based on on-off keying and using RF envelope detector 306 does not depend on a fixed local oscillator frequency.

Figure 4:
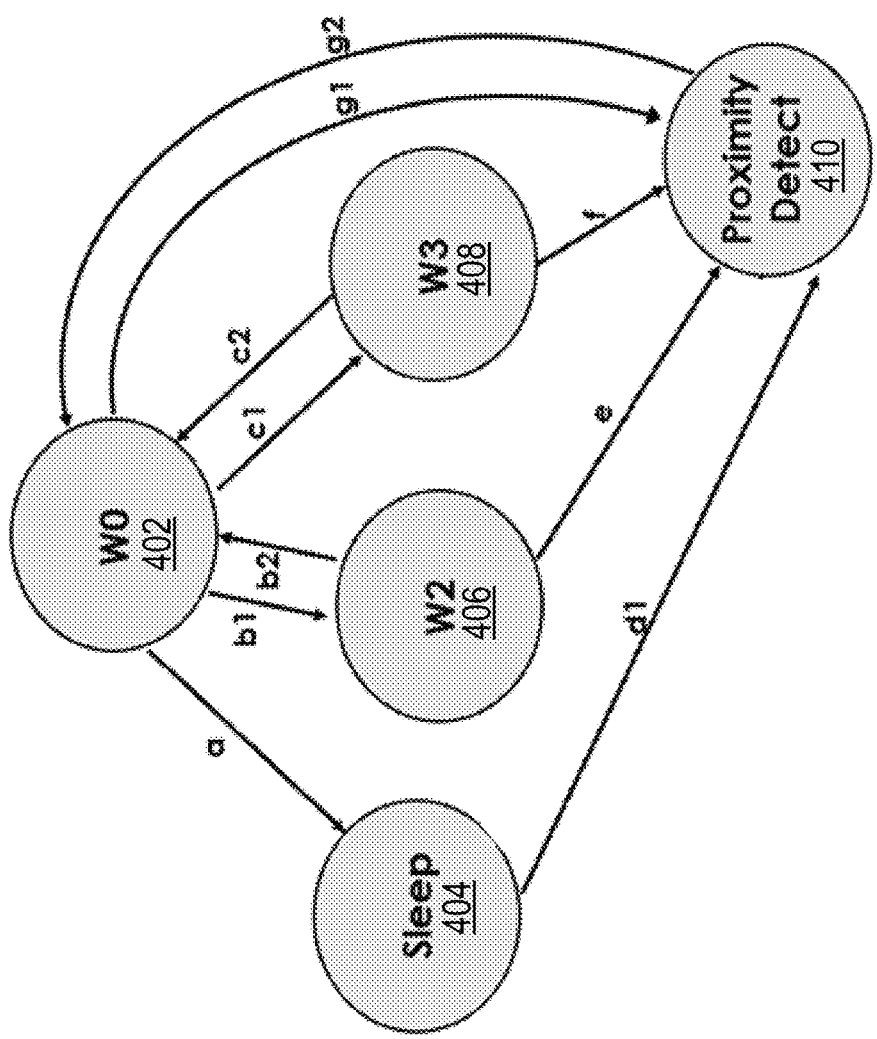
FIG. 4 illustrates an example state transition diagram of a wireless tunneling apparatus capable of tunneling USB data, according to one embodiment.

FIG. 4 illustrates an example state transition diagram for a wireless tunneling apparatus capable of tunneling USB data, according to one embodiment. In this embodiment, five possible power states are available: a W0 state 402, a W2 state 406, a W3 state 408, a proximity detect state 410, and a sleep state 404. The W0 state 402 represents the high power state in which the high frequency transmitting circuit 202, high frequency receiving circuit 314, and associated components are enabled, and the wireless tunneling apparatus 120 is actively transmitting, or is available and ready to transmit, high frequency serial data (e.g., USB data).

In the W0 state, the high frequency transmitting circuit 202 and the high frequency receiving circuit 314 are turned on and the wireless tunneling apparatus 120 may actively tunnel USB data. If proximity to the other apparatus is lost, the wireless tunneling apparatus 120 transitions to the proximity detect state 410. In the proximity detect state 410, the high frequency transmitting circuit 202 and high frequency receiving circuit 314 are turned off. The low frequency transmitting circuit 204 and low frequency receiving circuit 310 are turned on to periodically check for proximity to another apparatus and are turned off when not being used. A wireless tunneling apparatus pair 120A and 120B may enter the sleep state 404 from the W0 state if proximity detection is successful but the processing apparatus 110 is determined to be not attached. This determination is made in the W0 state 402. In the sleep state 404, only "always-on" blocks are running and other components are turned off for power efficiency. The wireless tunneling apparatus remains in the sleep state 404 for a pre-defined time, and then goes back to the proximity detect state 410 to make sure that wireless proximity is maintained. If a nearby apparatus is detected, the wireless tunneling apparatus 120 transitions back to the W0 state 402 in which attachment of the processing apparatus is checked. The W2 and W3 states 406, 408 are entered when a wireless tunneling apparatus pair 120A/120B is in wireless proximity, the processing apparatuses 110A/110B are in attached state, but the processing apparatuses 110 are in a low power state or are not actively communicating data. For example, the W2 state 406 is entered when the processing apparatus 110 is in a "U2" low-power state of USB 3.0 Superspeed, and the W3 state 408 is entered when the processing apparatus 110 is either in "U3" state of USB 3.0 Superspeed or in "Suspend" state of USB 2.0 Highspeed.

Each arc in FIG. 4 represents a possible transition between states. The conditions for transitioning between the states are summarized in the table and described in more detail below.

TABLE 1

State Transition for Wireless Tunneling Apparatus

| ARC | Local apparatus requirements | Remote apparatus requirements |
| --- | --- | --- |
| a | USB 2.0 disconnected and USB 3.0 disabled | proposed_link_state == SLEEP |
| b1 | USB 2.0 disconnected or suspended and USB 3.0 in U2 state. | proposed_link_state == W2 |
| b2 | USB 2.0/USB 3.0 wakeup event locally or remotely | n/a |
| c1 | USB 2.0 disconnected or suspended and USB 3.0 in U3 state | proposed_link_state == W3 |
| c2 | USB 2.0/USB 3.0 wakeup event locally or remotely | n/a |

TABLE 1-continued

State Transition for Wireless Tunneling Apparatus

| ARC | Local apparatus requirements | Remote apparatus requirements |
| --- | --- | --- |
| d | Sleep timer times out | n/a |
| e | Wireless keep-alive signal not seen for N seconds | n/a |
| f | Wireless keep alive signal not seen for N seconds | n/a |
| g2 | Into W0: Proximity is detected | n/a |
| g1 | HF wireless link is lost as determined by HF receiver synchronization state machine. | n/a |

Transitions out of the W0 state 402 (e.g., via arcs a, b1, c1, and g1) depend both on the state of the local wireless tunneling apparatus as well as the state of the remote wireless tunneling apparatus in proximity to the local wireless tunneling apparatus. In order to communicate the state of the local apparatus to the remote apparatus, and vice versa, a signal proposed_link_state is periodically transmitted between the apparatuses when in the W0 state 402 indicating the transition to a new state dictated by the local apparatus conditions. For example, in one embodiment, the signal proposed_link_state is a 2-bit signal encoding a state advertised by the local apparatus based on its conditions (e.g., '0' represents W0, '1' represents W2, '2' represents W3, and '3' represents Sleep). The signal proposed_link_state is periodically updated and exchanged over the wireless link when in the W0 state 402.

An apparatus advertises a transition to the sleep state 404 (arc a) when it detects that the processing apparatus 110 is disabled or disconnected. The apparatus advertises a transition to the W2 state 406 (arc b1) when it detects that USB 2.0 has disconnected or suspended and USB 3.0 has gone into U2 low-power state. The apparatus advertises a transition to the W3 state 408 (arc c1) when it detects that USB 2.0 has disconnected or suspended and USB 3.0 has gone into U3 state. The apparatus advertises a transition to the proximity detect state 410 when the HF wireless link (i.e., a wireless link 130 using high frequency transmit and receive data paths) is lost.

The state change out of W0 occurs only after both sides of the wireless link 130 advertise the same low power state (e.g., SLEEP, W2, or W3). Otherwise, both apparatuses remain in the W0 state 402. In the W0 state 402 the value of proposed_link_state is transmitted periodically. After both local and remote apparatuses advertise the same value of proposed_link_state, the apparatuses transition to that state.

Exiting from the W2 state 406 to the W0 state 402 (arc b2) is triggered by an upstream or downstream processing apparatus sending an exit event. For example, in USB 3.0, the exit event may comprise a U2 exit LFPS (Low Frequency Periodic Signaling) to a wireless tunneling apparatus 120. In order for the W2 exit to occur, the wireless tunneling apparatus 120 transmits back a handshake LFPS with low enough latency to meet the requirements of the underlying serial protocol (e.g., 2 ms for USB 3.0 links). In one implementation, the fast W2 exit is facilitated by keeping all phase-locked loops (PLLs) powered when operating in the W2 state 406.

Figure 5:
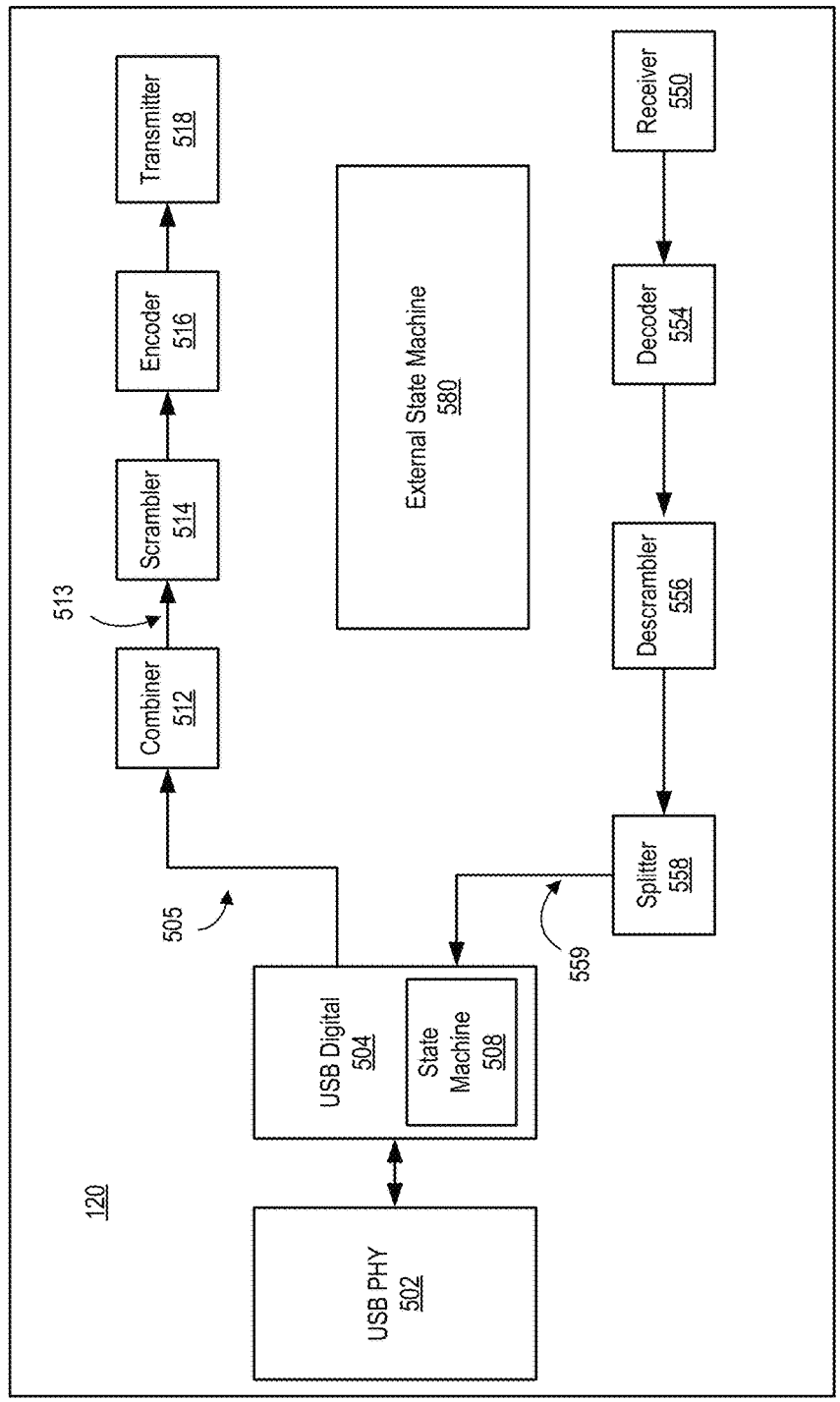
FIG. 5 illustrates a detailed architecture of a wireless tunneling apparatus, according to one embodiment.

FIG. 5 shows a detailed architecture of a wireless tunneling apparatus 120, according to one embodiment. While the diagram in FIG. 5 may correspond to the wireless tunneling apparatuses 120 illustrated in FIG. 1, it illustrates an example in further detail in order to better explain operation of the apparatuses 120 in accordance with one embodiment. In one embodiment, the wireless tunneling apparatus 120 includes a full-duplex high speed data-path capable of tunneling at USB 3.0 speeds. In one implementation, the wireless tunneling apparatus 120 includes a USB PHY 502, USB digital 504, a combiner 512, a scrambler 514, an encoder 516, a transmitter 518, an external state machine 580, a splitter 558, a descrambler 556, a decoder 554, and a receiver 550. In one embodiment, the transmitter 518 is the transmitter 122 of FIG. 1, the receiver 550 is the receiver 124 of FIG. 1, and the external state machine 580 (or a state machine 508 of the USB digital 504, or a combination of both) is the state machine 126 of FIG. 1. Additional components in FIG. 5 that are not shown in FIG. 1 are implemented for a proper communication conforming to USB protocol. Together, these components operate to determine a configuration of the wireless tunneling apparatus 120 and a configuration of a processing apparatus 110 to which the wireless tunneling apparatus 120 is coupled for a proper operation. Moreover, these components operate together to tunnel communication between two processing apparatuses 110, and perform power supply control, according to the determined configurations.

The USB PHY 502 is a mixed-signal interface circuit that is in one embodiment fully compliant with USB 3.0 electrical specification and supports all four different USB speeds: super-speed (5 Gbps), high-speed (480 Mbps), full-speed (12 Mbps), and low-speed (1.5 Mbps). It supports the full range of USB 3.0 host and peripheral applications.

The USB PHY 502 provides digital interfaces compliant with PIPE 3.0 (for SS) and UTMI+ (for HS/FS/LS). The UTMI+ provides two interfaces for FS/LS: standard 8-bit/16-bit interface or bit-serial interface. An embodiment of the tunneling architecture described herein uses the bit-serial interface in order to minimize end-to-end latency across the two wireless tunneling apparatuses 120. The bit-serial interface saves time to serialize and de-serialize bit data.

The USB PHY 502 implements reduced power consumptions for all low power states defined in USB 3.0 specification: U0/U1/U2/U3 for super-speed and suspend-resume for HS/FS/LS. It also supports the transmission and reception of Low Frequency Periodic Signaling (LFPS), as defined in the specification, for exiting from low power states.

USB super-speed data over a USB cable has a raw speed of 5 Gbps, out of which 20% is contributed by 8b/10b coding. This is prescribed in the USB standard to protect against cable related bit errors. As will be described below, this overhead is removed for wireless transmission and super-speed data bandwidth is reduced to 4 Gbps. Instead error correction codes are added for wireless transmission, so that wireless related bit errors can be detected and corrected.

The USB digital 504 tracks USB power states and apparatus states (e.g., attached/detached). This enables the wireless tunneling apparatus 120 to take advantage of the many USB 3.0 provisions for saving power consumption, such as for example, U0, U1, U2, and U3 states. In an embodiment, the USB digital state machine 508 includes an adapted implementation of Link Training and System Status Machine (LTSSM) from USB 3.0 specification and Reset Protocol State Machine (RPSM) from USB 2.0 specification. These link-layer state machines maintain states of host apparatus 110A and device apparatus 110B on opposite side of the wireless link, as shown in FIG. 1, thereby allowing seamless connections between a USB host apparatus 110A and USB device apparatus 110B as if there were no wireless tunneling apparatus 120 between the two.

The USB payload for wireless transmission comprises either USB packet data directly from USB PHY 502 or signaling information generated by the state-machines 508 inside USB digital 504.

The Link Training and Status State Machine (LTSSM) in USB 3.0 specification is a state machine defined for link connectivity and link power management. The state-machine 508 is designed to track the LTTSM state of the USB host/device/hub on the opposite side of the wireless link, as shown in FIG. 1.

The state machine 508 facilitates components within the wireless tunneling apparatus 120 (e.g., digital, mixed-signal, and radio blocks) to go into different power states based on power state of the USB link. In one example, the wireless logic supports four power states: W0, W2, W3, and Sleep. W0 is the normal operating mode of wireless tunneling apparatus 120 and consumes the highest power. It corresponds to USB U0 state. The other three states are low power states. Table 2 below summarizes the mapping.

TABLE 2

Mapping between USB LTSSM states and wireless power states

| LTSSM States (from USB3.0 Specification) | Wireless Power States |
|---|---|
| U1 | W0 |
| U2 | W2 |
| U3 | W3 |
| SS.Disabled, SS.Inactive, Rx.Detect | Loop between W0/Sleep |
| U0 and all other active states | W0 |

According to the corresponding state, the USB digital 504 receives input data from the local processing apparatus 110A through the USB PHY 502, and provides the transmit communication signal 505 corresponding to the input data to the combiner 512 for transmission to the remote processing apparatus 110B.

The combiner 512 receives a transmit communication signal 505 compliant with a wired communication protocol and generates a combined signal 513 for an output to the scrambler 514. The combiner 512 packs four different streams. In one embodiment, the combiner receives two data streams from USB digital 504: one for USB3.0 super-speed data and another to carry data for any one of the USB HS, LS, FS modes at a time. The combiner 512 packs the two data streams from USB digital 504 along with two other auxiliary data streams from external state machine 580. Combining is done as per a fixed frame-structure format designed for efficient wireless transmission. The number of slots in the frame-structure allocated per data stream is designed to satisfy wireless bandwidth requirement per data stream, while also minimizing worst inter-slot latency per data stream.

The scrambler 514 converts the output from combiner 512 into a binary sequence that is random. An unscrambled binary sequence may have undesirable properties such as non-zero DC bias (number of 0's and 1's are not same) or long runs of '1's or '0's. Such properties could be detrimental to the performance of analog and RF circuits inside transmitter 518. As shown in next section, the input of the encoder 516 (e.g., a forward error correction (FEC) encoder) appears as the systematic part of the FEC output, and is eventually coded into an analog signal. Therefore, without scrambling, these undesirable properties could be carried over on to the analog signal, which creates adverse effects in analog circuits. Statistically, the parity part of the FEC output is also randomized together with the input.

The encoder 516 encodes the scrambled sequence from the scrambler 514 with redundancy, so that the receiver side could possibly correct bit errors introduced during wireless transmission. The FEC used in one implementation is a (232, 216) Bose-Chaudhuri-Hocquenghem code (BCH code), which is a cyclic error-correcting code in which each output code-word has 232 bits for a given 216-bit sequence. BCH code beneficially has error correction capability and low encoding and decoding latency. The code is systematic, which implies that the first 216 bit output is just copied from the input sequence. The last 16 bits are encoded using a BCH code generator matrix.

The transmitter 518 receives the encoded signal from the encoder 516, upconverts the encoded signal and transmits the upconverted signal wirelessly. In one aspect, the transmitter 518 is implemented as the transmitter 122 described with respect to FIG. 2. In one example, the encoded signal from the encoder 516 is received by the DAC 206 of the transmitter 122, and upconverted by the TX Mixer 208 of the transmitter 122 shown in FIG. 2. The upconverted signal is transmitted through the antenna 212 of the transmitter 122 shown in FIG. 2.

The receiver 550 receives a wireless receive signal from a transmitter of another wireless tunneling apparatus 120, and downconverts the wireless receive signal. In one aspect, the receiver 550 is implemented as the receiver 124 described with respect to FIG. 3. In one example, the wireless receive signal is received by the antenna 302 of the receiver 124, and downconverted by the RF envelope detector 306 of the receiver 124 shown in FIG. 3. The downconverted signal is output to the decoder 554 through the clock/data recovery circuit 312 of the receiver 124 shown in FIG. 3

The decoder 554 receives the downconverted signal from the receiver 550, and decodes the recovered signal. In one embodiment, a hard-decision based BCH decoder is implemented. The FEC decoder first calculates the syndromes to indicate if there exists any bit error in the code-word. If so, the next step is to locate the error locations and flip the corresponding bits. The (232, 216) BCH code can correct up to two bit errors in a 232-bit code-word. This coding scheme improves bit errors that are independent and random.

The descrambler 556 receives the decoded signal from the decoder 554 and descrambles the decoded signal.

The splitter 558 receives the descrambled data and unpacks frame-structure of data bits to produce a receive communication signal 559. The splitter 558 provides the receive communication signal 559 to the USB digital 504, primarily. It also provides auxiliary data streams to the external state machine 580 In creating the receive communication signal 559, the splitter 558 removes "Wireless Fillers" that were inserted by the combiner 512 of another wireless tunneling apparatus 120. The "Wireless Fillers" are inserted by combiner 512 when there is no data stream available in the transmit communication signal 505 (e.g., USB data-stream) at the time when the corresponding slot in frame-structure is due for transmission. The number of slots in the frame-structure allocated per data stream is designed to be close to but greater than what is necessary to satisfy the wireless bandwidth requirement per data stream.

In one embodiment, the USB digital 504 receives the receive communication signal 559 and generates an output signal to the local processing apparatus 110A. In one aspect, the USB digital state machine 508 predicts a state of the remote processing apparatus 110B based on the receive communication signal 559 and generates the output signal conforming to the first wired communication protocol. The output signal is transmitted to the local processing apparatus 110A through the USB PHY 502.

The external state-machine 580 controls numerous system functions including, for example:

1) control power state of wireless blocks & USB PHY based on USB power state,
2) ensure synchronicity of USB host and device by reproducing the link response across the wireless link,
3) detect detachment and attachment of USB host/device, and
4) process value of VBUS_IN pin from attached USB host and drive VBUS_OUT pin for attached USB device.

Figure 6:
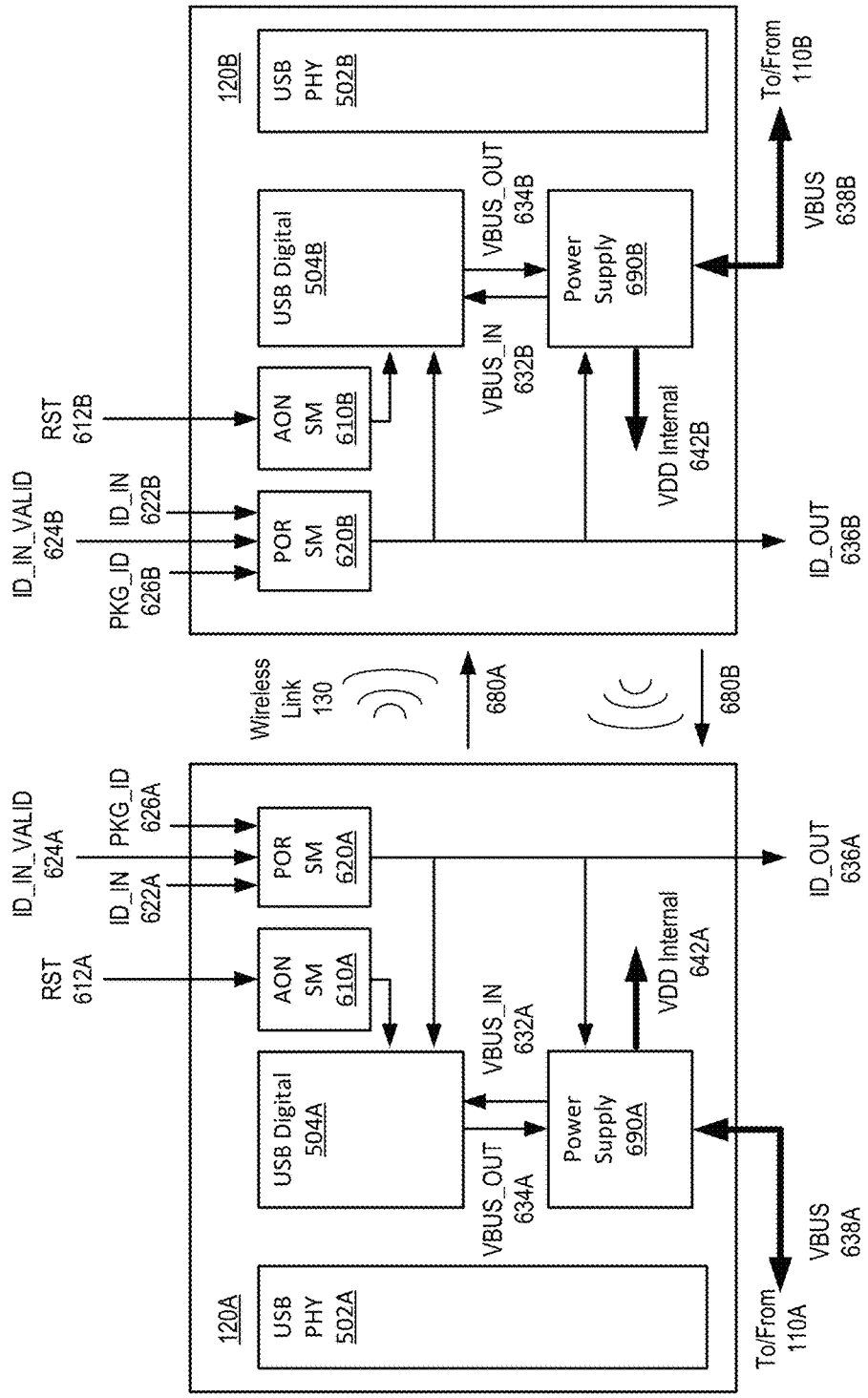
FIG. 6 illustrates two wireless tunneling apparatuses configured to determine configurations of processing apparatuses and corresponding configurations of the wireless tunneling apparatuses, according to one embodiment.

FIG. 6 illustrates two wireless tunneling apparatuses 120A and 120B including details of components used to determine the respective configurations of the wireless tunneling apparatuses 120A, 120B (e.g., upstream or downstream) in the context of the current connection, and components for controlling power to and from the wireless tunneling apparatuses 120A, 120B dependent on the configurations. In one embodiment, the wireless tunneling apparatus 120A includes USB PHY 502A, USB digital 504A, always-on state-machine (AON SM) 610A, a power-on-reset state-machine (POR SM) 620A and a power supply 690A. The wireless tunneling apparatus 120A receives a reset (RST) signal 612A, an identifier input (ID_IN) signal 622A, an identifier valid (ID_IN_VALID) signal 624A, and a package identifier (PKG_ID) signal 626A within the computing system 150. The control signals for power supply 690A are VBUS_IN 632A, VBUS_OUT 634A, and ID_OUT 636A. The architecture and the operation of the wireless tunneling apparatus 120B are similar to the architecture and the operation of the wireless tunneling apparatus 120A. In one embodiment, the values of ID_IN 622A and ID_IN_VALID 624A could be controlled by the local processing apparatus 110A coupled to the wireless tunneling apparatus 120A. These values are used to determine the configuration and role of the wireless tunneling apparatus 120A based on the received signals, as described in detail below. The resolved configuration of the wireless tunneling apparatus 120A is indicated by an identifier output (ID_OUT) signal 636A. The VBUS pin 638A in a USB cable carries power supplied by the USB host, and also indicates attachment of a USB host.

For an "upstream" wireless tunneling apparatus once the ID configuration is resolved and USB host attachment is detected, the power supply 690 can supply power to components in the wireless tunneling apparatus 120 through VDD Internal pin(s) 642. An "upstream" power supply 690 also provides control signal VBUS_IN 632 (for example, VBUS_IN is '1' for USB host attached, and '0' for USB host not attached) to the local USB digital (e.g., 504A) so that it can communicate with remote USB digital (e.g., 504B) in the remote wireless tunneling apparatus about USB host attachment status. Likewise, a "downstream" USB digital 504 provides control-signal VBUS_OUT 634 to the power supply 690. Based on the value of VBUS_OUT 634 a "downstream" power supply 690 drives VBUS 638 for the processing apparatus 110. The VBUS_OUT pin is not used in an "upstream" wireless tunneling apparatus and, likewise, the VBUS_IN pin is not used in a "downstream" wireless tunneling apparatus. The power pins VDD Internal 642 may comprise numerous power pins, for example, one for AON SM 610 and POR SM 620, and another for all other domains. The power supply 690 may supply power to AON SM 610 and POR SM 620 with power via VDD internal pins 642 at all times, while selectively supply power to other domains depending on ID configuration results and/or USB attachment results. The power supply 690 may supply power to the local processing apparatus 110 through VBUS 638 based on USB rules of roles and attachment.

In one embodiment, the AON SM 610A and the POR SM 620A are part of the external state machine 580 of FIG. 5. The AON SM 610A receives RST signal 612A, and pairs the wireless tunneling apparatus 120 with another wireless tunneling apparatus 120 in response. After the pairing, the AON SM 610A enables the POR SM 620A.

The POR SM 620A receives an ID_IN signal 622A and an ID_IN_VALID signal 624A locally through a wired connection and determines an initial local configuration of the local processing apparatus 110A (or equivalently, the initial local configuration of the wireless tunneling apparatus 120A). Depending on the implementation and operating conditions of the connected processing apparatus 110A or other connected apparatuses, the ID_IN signal 622A may or may not provide a valid representation of the configuration. Here, the ID_IN_VALID signal 624A indicates whether the initial configuration specified by the ID_IN signal 622A is valid (e.g., ID_IN_VALID='1') or whether the initial configuration cannot be determined from the ID_IN signal 622A (e.g., ID_IN_VALID='0'). The ID_IN signal 622A indicates an initial local configuration of the local processing apparatus 110A (or the local wireless tunneling apparatus 120A) when the ID_IN_VALID signal 624A is valid. For example, ID_IN='0' indicates an upstream apparatus and ID_IN='1' indicates a downstream apparatus, if ID_IN_VALID is '1'. The POR SM 620B of the wireless tunneling apparatus 120B similarly receives an ID_IN signal 622B, and ID_IN_VALID signal 624B locally through a wired connection and determines an initial configuration of the processing apparatus 110B (or the wireless tunneling apparatus 120B) through the process above.

In one embodiment, values of the ID_IN signal 622A and the ID_IN_VALID signal 624A can be fixed. Specifically, input pins for receiving the ID_IN signal 622A and the ID_IN_VALID signal 624A can be tied to VDD corresponding to a high value or a ground corresponding to a low value. In another embodiment, values of the ID_IN signal 622A and the ID_IN_VALID signal 624A can be changed dynamically. Specifically, input pins for receiving the ID_IN signal 622A and the ID_IN_VALID signal 624A can be driven by the processing apparatus 110A. Hence, the values of the ID_IN signal 622A, the ID_IN_VALID signal 624A, or both can be changed during operation or during a start-up. The processing apparatus 110A may have a priori knowledge about application to be run across the wireless tunneling system and configure the ID_IN 622A and ID_IN_VALID 624A pins accordingly.

In one embodiment, the POR SM 620A of the wireless tunneling apparatus 120A and the POR SM 620B of the wireless tunneling apparatus 120B exchange initial configurations through the wireless link 130. In another embodiment, the POR SM 620A of the wireless tunneling apparatus 120A and the POR SM 620B of the wireless tunneling apparatus 120B exchange ID_IN signal and ID_IN_VALID signal through the wireless link 130, and one of the processing the POR SM 620A and the POR SM 620B can determine an initial configuration of the other wireless tunneling apparatus based on the ID_IN signal and ID_IN_VALID signal of the other wireless tunneling apparatus through the similar process described above for determining its own configuration.

Based on the initial configurations of the wireless tunneling apparatuses 120A and 120B, the POR SM 620A determines the resolved configuration (also referred to as "an assigned configuration") of its wireless tunneling apparatus 120A and a corresponding assigned configuration of the wireless tunneling apparatus 120B. The function to determine the assigned configurations of the wireless tunneling apparatus 120B indicated by ID_OUT 636A is described in Table 3. Here, local ID_IN indicates an identifier for an initial local configuration of a local wireless tunneling apparatus 120 (e.g., upstream='0', downstream='1'), local ID_IN_VALID represents the valid/invalid signal for the local wireless tunneling apparatus (e.g., Invalid='0', Valid='1'), remote ID_IN represents an identifier for an initial remote configuration of the remote wireless tunneling apparatus 120, and remote ID_IN_VALID represents the valid/invalid signal for the remote wireless tunneling apparatus. In the illustrated table, the signal local ID_OUT represents the assigned configuration for the local wireless tunneling apparatus 120. Note that there is an inversion in the value of local ID_OUT (see Line 5 for example, where value of local ID_OUT is opposite of local ID_IN). This is, as explained above, because the local wireless tunneling apparatus 120 mirrors the remote processing apparatus. Thus, the ID_OUT signal is output to the local processing apparatus 110 in the same manner as if the remote processing apparatus 110 was directly connected to the local processing apparatus 110. Because the local and remote wireless tunneling apparatuses are generally set to complimentary configurations, (e.g., one is upstream and one is downstream), the assigned local configuration can be set by determining the remote configuration or vice versa. The output ID_OUT 636A may be used to control a processing apparatus 110A connected to the wireless tunneling apparatus 120A.

TABLE 3

USB ID-pin resolution

| | local ID_IN | local ID_IN_VALID (0: Invalid, 1: Valid) | remote ID_IN | remote ID_IN_VALID (0: Invalid, 1: Valid) | local ID_OUT |
|---|---|---|---|---|---|
| 1 | 0 | 0 | 0 | 1 | 0 |
| 2 | 0 | 0 | 1 | 1 | 1 |
| 3 | 0 | 1 | 0 | 0 | 1 |
| 4 | 0 | 1 | 1 | 0 | 1 |
| 5 | 0 | 1 | 1 | 1 | 1 |
| 6 | 1 | 0 | 0 | 1 | 0 |
| 7 | 1 | 0 | 1 | 1 | 1 |
| 8 | 1 | 1 | 0 | 0 | 0 |
| 9 | 1 | 1 | 0 | 1 | 0 |
| 10 | 1 | 1 | 1 | 0 | 0 |
| 11 | 0 or 1 | 0 | 0 or 1 | 0 | Use PKG_ID |
| 12 | 0 | 1 | 0 | 1 | Error; use PKG_ID |
| 13 | 1 | 1 | 1 | 1 | Error; use PKG_ID |

As seen from the logic of Table 3, the configurations of both local and remote wireless tunneling apparatuses 120 can be confirmed when both ID_IN signals are valid and when the ID_IN signals represent complimentary configurations (rows 5 and 9 of Table 3). In case a configuration of one of the wireless tunneling apparatus 120 is undetermined (e.g., ID_IN_VALID='0'), and a configuration of the other wireless tunneling apparatus 120 is determined (e.g., ID_IN_VALID='1') as listed in rows 1, 2, 3, 4, 6, 7, 8, and 10, a configuration of the wireless tunneling apparatus 120 can be determined and assigned based on the configuration of the other wireless tunneling apparatus 120. In one approach, an assigned configuration of the wireless tunneling apparatus 120 (or the processing apparatus 110) is determined to be a counterpart configuration of the determined configuration of the other wireless tunneling apparatus 120 (or the other processing apparatus 110). Accordingly, a configuration of the wireless tunneling apparatus 120 locally coupled to the processing apparatus 110 through a connection 116 (e.g., cable 116) can be determined to be a matching configuration (i.e., same).

Row 11 of Table 3 represents a scenario in which the initial configurations of both wireless tunneling apparatuses are undetermined because the ID_IN_VALID signals for both apparatuses indicate that each ID_IN signal is invalid. In this case, external PKG_ID signals 626 may be used to force the configurations of the wireless tunneling apparatuses 120. For two wireless tunneling apparatuses 120 that are determined to be successfully paired the values of PKG_IG are opposite and can be successfully used to generate opposite values of ID_OUT for the local wireless tunneling apparatus 120 and the remote wireless tunneling apparatus 120. In one embodiment, the PKG_ID signal 626 is a hardwired signal representing the antenna polarization type (e.g., type X and type Y) which are generally opposite in a typical connection (e.g., mobile apparatus to docking station). Thus, for example, a wireless tunneling apparatus 120 having an antenna polarization consistent with a docking station may be initially configured as an upstream apparatus by default while a wireless tunneling apparatus 120 having an antenna polarization consistent with a mobile apparatus may be initially configured as a downstream apparatus by default.

Rows 12 and 13 of Table 3 are error conditions, representing cases where two wireless tunneling apparatuses 120 each advertise as being of the same initial configuration (e.g., both upstream or both downstream). In these cases, the configurations of the wireless tunneling apparatuses 120 may also be forced to complimentary configurations using PKG_ID signals 626. However, because these conditions indicate incompatibility between the processing apparatus 110, the wireless tunneling apparatus 120 may shut down the USB components in order to save power. In such error conditions, in one embodiment other auxiliary functions of the wireless tunneling apparatus 120 may be kept functional while the USB functions are shut down.

In one embodiment, the assigned configuration of the wireless tunneling apparatus 120 is transmitted to another wireless tunneling apparatus 120 through the wireless link 130.

According to the assigned configuration of the wireless tunneling apparatus 120A, the USB digital 504A can operate according to its configuration. The USB digital 504A starts functioning only after a reset signal from AON SM 610 is released and the value of ID_OUT signal 636A from POR SM 620A is available. The USB digital 504A configures the USB PHY 502A according to its configuration to properly communicate with the local processing apparatus 110A through the wired connection.

The wireless tunneling apparatus 120A also includes a power supply 690A to perform functions according to the assigned configuration of the wireless tunneling apparatus 120A. An upstream power supply 690 receives power on VBUS 638 from a USB host (e.g., local processing apparatus 110A) indicating attachment of a USB host. This attachment event is indicated via the VBUS_IN 632A to the USB digital 504. Responsive to detecting the power at the VBUS_IN 632A (in an upstream wireless tunneling apparatus 120) the USB digital 504A may generate a power detection signal 680A, and transmit the power detection signal 680A through the wireless link 130. Additionally, for a downstream wireless tunneling apparatus 120B, the power supply unit 690B can output power on VBUS 638B to the processing apparatus 110B based on the control signal VBUS_OUT 634B responsive to receiving a power detection signal 680A of the other wireless tunneling apparatus 120A through the wireless link 130.

The VBUS_IN 632 and VBUS_OUT 634 are control signals related to power supply 690 along with the assigned configuration ID_OUT 636. The power supply 690 can either detect or supply power on VBUS 638. The control signal VBUS_IN is an output of the power supply 690 and is a control signal for the USB digital 504 to indicate that a processing system of type USB host has been attached. This control signal is used by wireless tunneling apparatus 120 with the assigned configuration of the type upstream. Likewise the control signal VBUS_OUT is used by the wireless tunneling apparatus 120 with the assigned configuration of the type downstream. This is an output of the USB digital 504 and responsive to the power detection signal 680. The USB digital 504A on the Upstream side checks the input signal VBUS_IN 632A to start the super-speed/USB 2.0 state-machines. The output signal VBUS_OUT 634B is driven by the USB digital 504B on the downstream side after VBUS_IN 632A is high (i.e., processing apparatus 110A is providing power to the wireless tunneling apparatus 120A) on the upstream side. This is communicated to downstream side over wireless link using the signal information transmitted by super-speed/USB 2.0 state machines.

In various embodiments, the VBUS_IN 632 could be implemented in many different ways. Example configurations of the VBUS_IN 632 include, but are not limited to:

1) VBUS_IN 632 tied unconditionally HIGH for designs in which power is present irrespective of USB attachment,
2) VBUS_IN 632 directly connected to VBUS digital output (control) pin (instead of a cable-compliant power pin) of an upstream USB Host IC in systems where the connection between the processing apparatus 110 and the wireless tunneling apparatus 120 happens to be on the same board (e.g., a printed circuit board) and using traces, or
3) VBUS_IN 632 directly the output of a local on-board circuitry, for example, the circuitry may be a resistor divider from 5V to IO voltage level of the wireless tunneling apparatus chip 120.

In some embodiments, depending on the system design the VBUS_OUT 634A control pin may be left unused or coupled to a digital pin of a downstream USB Device IC connected via traces on the same board, or coupled to a power-management IC.

In one embodiment, the USB digital 504 detects whether the local processing apparatus 110 is coupled to the wireless tunneling apparatus 120 based on whether power can be detected at the power detection pin 658A. Specifically, the power supply 690, the state machine 508 or the external state machine 580 is configured to (i) determine that the local processing apparatus is coupled to the local wireless tunneling apparatus responsive to detecting the input power from the local processing apparatus, or (ii) determine that the local processing apparatus is decoupled from the local wireless tunneling apparatus responsive to not detecting the input power from the local processing apparatus.

Figure 7:
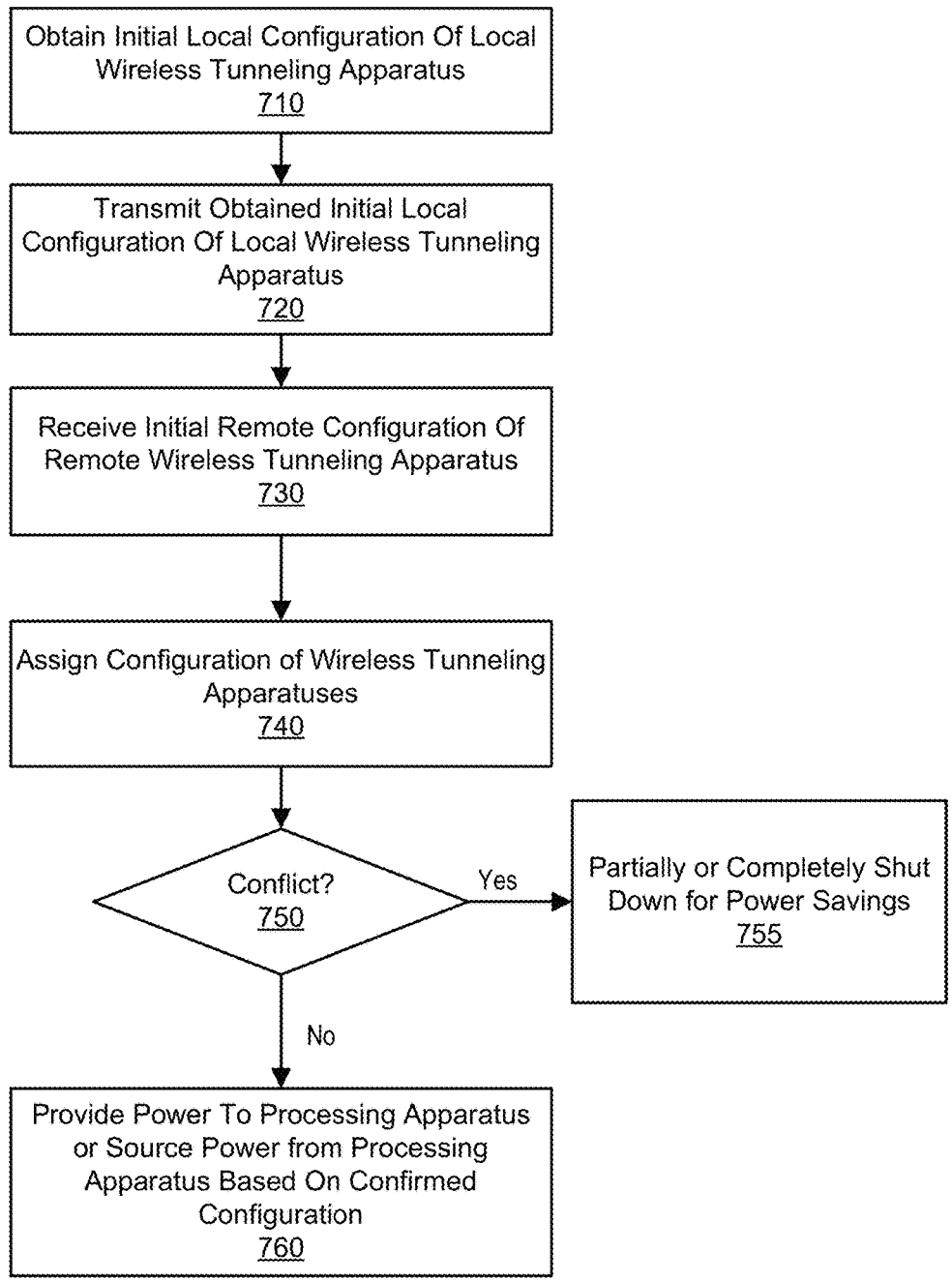
FIG. 7 illustrates an example process of determining a resolved configuration of wireless tunneling apparatuses, according to one embodiment.

FIG. 7 illustrates an example process of assigning a configuration of a wireless tunneling apparatus, according to one embodiment. The steps in FIG. 7 are performed by a local wireless tunneling apparatus 120A. Alternatively, the steps in FIG. 7 can be performed by a remote wireless tunneling apparatus 120B or other apparatuses.

In one embodiment, the local wireless tunneling apparatus 120A obtains 710 an initial local configuration of local wireless tunneling apparatus 120A. The local wireless tunneling apparatus 120A receives identification information (e.g., ID_IN and ID_IN_VALID) of the local processing apparatus 110A through a wired connection. Based on the received identification information of the local processing apparatus 110A, the local wireless tunneling apparatus 120A determines an initial local configuration of the local wireless tunneling apparatus 120A compatible with the local processing apparatus 110A. For example, responsive to determining the local processing apparatus 110A is of an upstream configuration, the local wireless tunneling apparatus 120A determines that the initial local configuration of the local wireless tunneling apparatus 120A is an upstream apparatus. Similarly, responsive to determining the local processing apparatus 110A is of a downstream configuration, the local wireless tunneling apparatus 120A determines that initial local configuration of the local wireless tunneling apparatus 120A is a downstream apparatus. Responsive to the initial local configuration of the local processing apparatus 110A being undetermined (or unknown), the local wireless tunneling apparatus 120A determines that the configuration of the local wireless tunneling apparatus 120A is initially undetermined and attempts to resolve the configuration based on an advertised initial remote configuration received from the remote wireless tunneling apparatus 120B.

The local wireless tunneling apparatus 120A transmits 720 the obtained initial local configuration of the local wireless tunneling apparatus 120A to a remote wireless tunneling apparatus 120B. Moreover, the local wireless tunneling apparatus 120A receives 730 an initial remote configuration of a remote wireless tunneling apparatus 120B (or an initial remote configuration of the remote processing apparatus 110B). In other embodiment, the local wireless tunneling apparatus 120 receives 730 the initial remote configuration of the remote wireless tunneling apparatus 120B first, then transmits 720 the initial local configuration of the local wireless tunneling apparatus 120A.

The local wireless tunneling apparatus 120A assigns 740 a configuration of the local wireless tunneling apparatus 120A, for example, using Table 3 above. This step 740 may include assigning a configuration to an initially undetermined apparatus to be complementary to the known configuration of the other apparatus or assigning a configuration based on package type. For example, in one embodiment, in case the initial local configuration of the local wireless tunneling apparatus 120A was initially undetermined and the initial remote configuration of the remote wireless tunneling apparatus 120B was determined, the configuration of the local wireless tunneling apparatus 120A is assigned to be counterpart to the configuration of the remote wireless tunneling apparatus 120B. In case the configurations of both wireless tunneling apparatuses 120 are determined and no conflict exists such that the configurations are counterpart to each other, the respective initial configurations of the wireless tunneling apparatuses are confirmed and assigned. In other cases, the configurations are assigned to default values based on the package type, which should be complementary to each other. In one embodiment, the local wireless tunneling apparatus 120 transmits the resolved local configuration of the local wireless tunneling apparatus 120A to the remote wireless tunneling apparatus 120B.

The wireless tunneling apparatus determines 750 whether a conflict exists in the initial local configuration and the initial remote configuration of the wireless tunneling apparatuses 120. Specifically, if both wireless tunneling apparatuses 120 are of same initial configurations, the local wireless tunneling apparatus 120A determines that a conflict exists. Otherwise, the local wireless tunneling apparatus 120A determines that there is no conflict.

Responsive to determining that the conflict exists, the local wireless tunneling apparatus 120A may partially or completely shut down 755 to save power. For example, the functions (e.g., USB digital 504A and USB PHY 502A) of the wireless tunneling apparatus 120A can be partially disabled, but the wireless components (e.g., transmitter 122A and receiver 124A) may be enabled or operate in a low power mode to transport auxiliary data such as control data or other non-USB data.

Responsive to determining that there is no conflict, the local wireless tunneling apparatus provides 760 power to the local processing apparatus or sources power from the local processing apparatus according to the assigned configuration. For example, if the local wireless tunneling apparatus 120A is configured as an upstream apparatus, the local wireless tunneling apparatus 120A sources power from the local processing apparatus 110A. If the local wireless tunneling apparatus 120A is configured as a downstream apparatus, the local wireless tunneling apparatus 120A provides power to the local processing apparatus 110A in response to the power detection signal indicating that the remote wireless tunneling apparatus 120B is receiving power from the remote processing apparatus 110B.

Figure 8A:
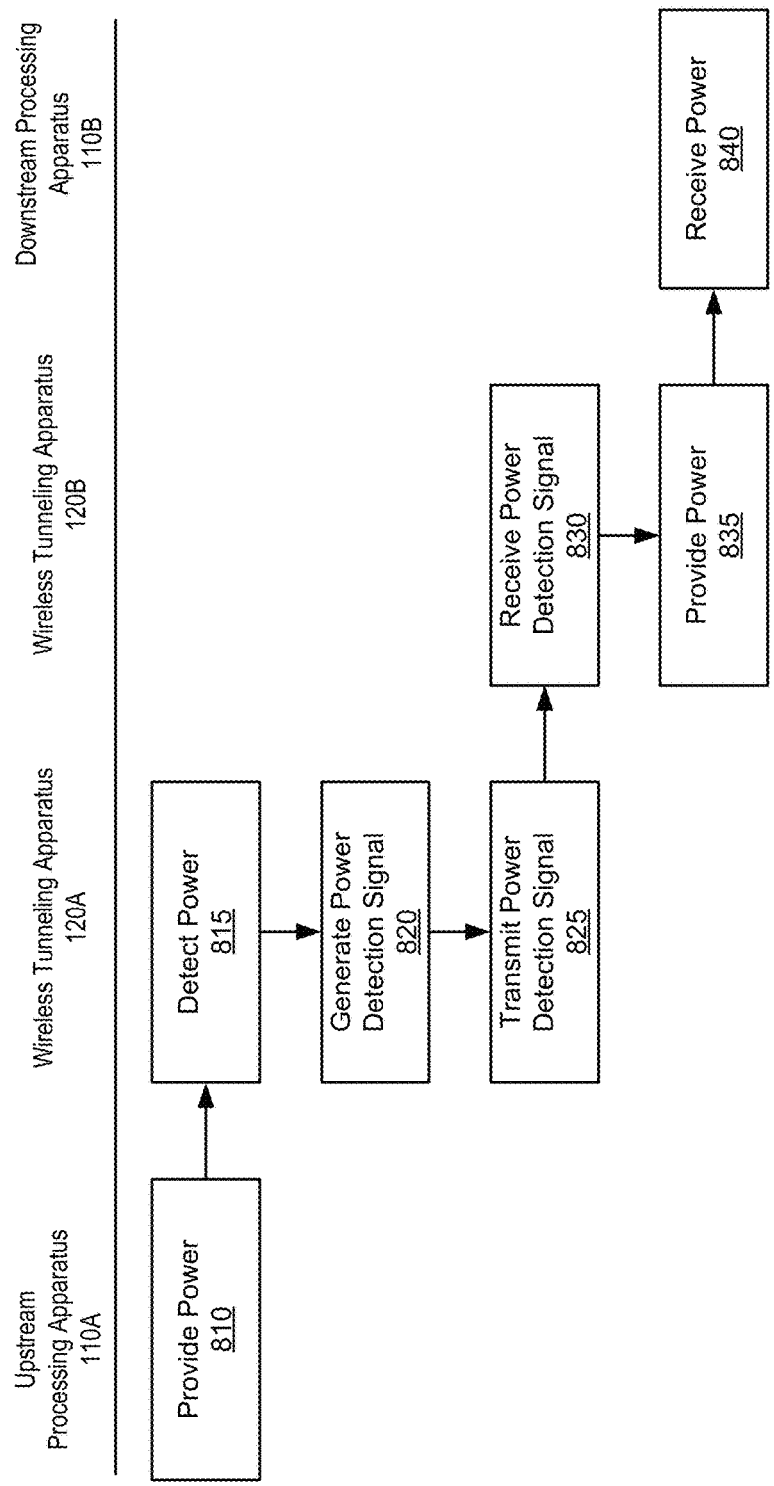
FIG. 8A illustrates an example interaction diagram of a power management among wireless tunneling apparatuses and processing apparatuses, according to one embodiment.

FIG. 8A illustrates an example interaction diagram of a process for power management among the wireless tunneling apparatuses 120 and the processing apparatuses 110, according to one embodiment. In this example, the wireless tunneling apparatus 120B provides power to the downstream processing apparatus 110B, responsive to the power detection signal generated from the upstream wireless tunneling apparatus 120A.

The upstream processing apparatus 110A operating as a "host" provides 810 power to the upstream wireless tunneling apparatus 120A.

The upstream wireless tunneling apparatus 120A detects 815 power from the upstream processing apparatus 110A, and generates 820 a power detection signal responsive to detecting the power. The upstream wireless tunneling apparatus 120A transmits 825 the power detection signal to the downstream wireless tunneling apparatus 120B.

The downstream wireless tunneling apparatus 120B receives 830 the power detection signal from the upstream wireless tunneling apparatus 120A. Responsive to receiving the power detect signal, the wireless tunneling apparatus 120B provides 835 power to the downstream processing apparatus 110B.

The downstream processing apparatus 110B receives 840 the power provided from the downstream wireless tunneling apparatus 120B.

Figure 8B:
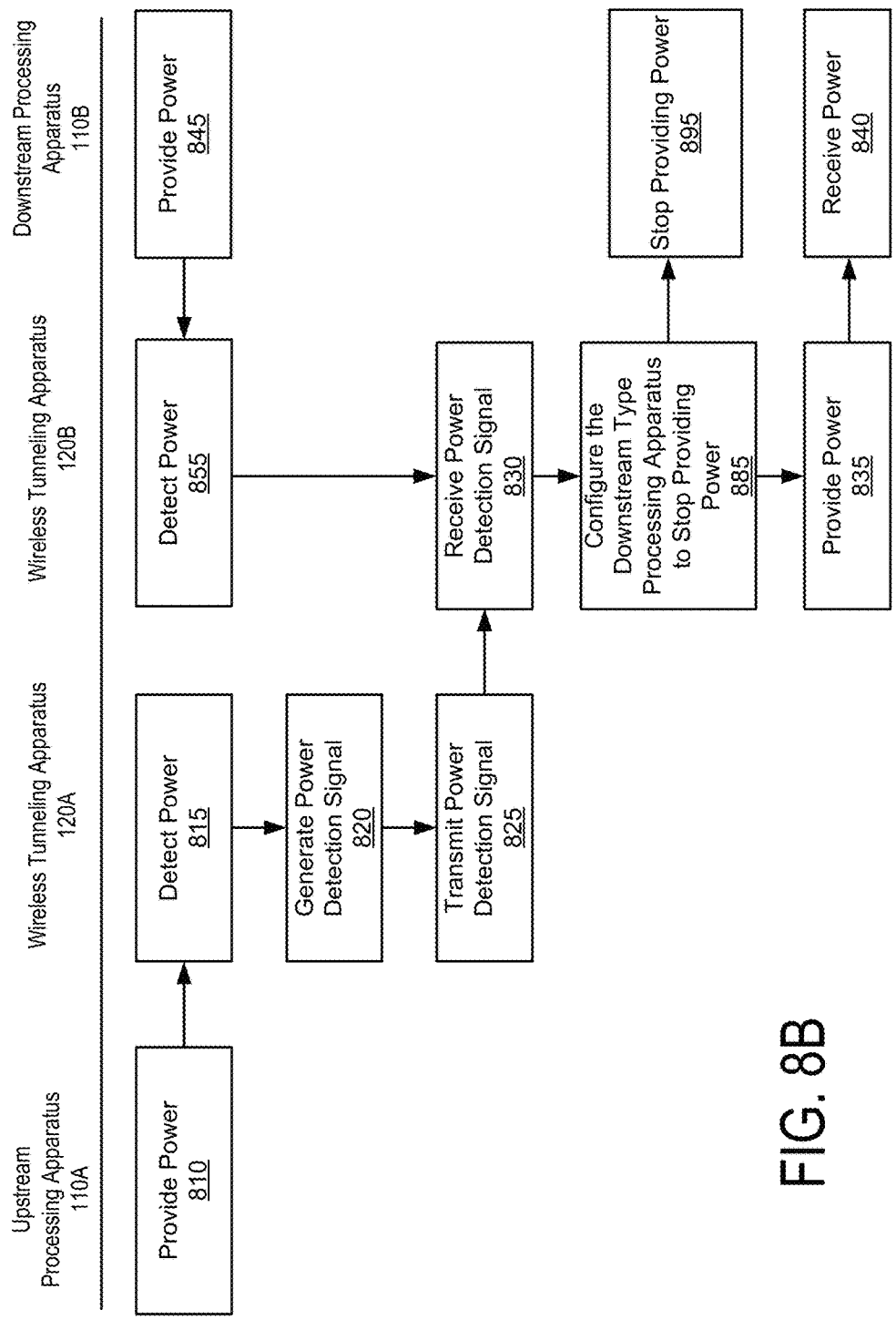
FIG. 8B illustrates an example interaction diagram of a power management among wireless tunneling apparatuses and processing apparatuses, according to another embodiment.

FIG. 8B illustrates an example interaction diagram of a power management among the wireless tunneling apparatuses and the processing apparatuses, according to another embodiment. In this example, the downstream processing apparatus 110B initially operates based on its own power source, but after the downstream wireless tunneling apparatus 120B receives the power detection signal from the upstream wireless tunneling apparatus 120A, the downstream wireless tunneling apparatus 120B provides power to the downstream processing apparatus 110B. Hence, the downstream processing apparatus 110B no longer needs to operate based on its power source, but instead can operate based on the power supplied from the downstream wireless tunneling apparatus 120B. The steps 810, 815, 820, and 825 are the same as the ones described with respect to FIG. 8A. Therefore, the detailed description thereof is omitted herein for the sake of brevity.

During or before the downstream wireless tunneling apparatus 120B receives 830 the power detection signal from the upstream wireless tunneling apparatus 120A, the downstream processing apparatus 110B provides 845 power to the downstream wireless tunneling apparatus 120B. The downstream wireless tunneling apparatus 120B detects 855 power from the downstream processing apparatus 110B.

In one embodiment, after the downstream wireless tunneling apparatus 120B receives 830 the power detection signal from the upstream wireless tunneling apparatus 120A, the downstream wireless tunneling apparatus 120B configures 885 the downstream processing apparatus to stop providing power, and the downstream wireless tunneling apparatus 120B provides 835 power to the downstream processing apparatus 110B. Accordingly, the downstream processing apparatus 110B stops 895 providing power to the downstream wireless tunneling apparatus 120B and receives 840 power from the downstream wireless tunneling apparatus 120B. Thus, the downstream processing apparatus 110B operates based on the power supplied from the downstream wireless tunneling apparatus 120B.

In another embodiment, responsive to detecting the power from the downstream processing apparatus 110B, the downstream wireless tunneling apparatus 120B omits the steps of 885 and 835 even after receiving the power detection signal from the upstream wireless tunneling apparatus 120A. Thus, in this embodiment, the downstream wireless tunneling apparatus does not provide power to the downstream processing apparatus 110B regardless of power detection signal from the upstream wireless tunneling apparatus 120A.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

What is claimed is:

1. A local wireless tunneling apparatus that operates in conjunction with a remote wireless tunneling apparatus to wirelessly tunnel communications between a remote processing apparatus and a local processing apparatus while being compliant with a wired communication protocol of the communications between the remote and local processing apparatuses, the local wireless tunneling apparatus comprising:
    a wireless receiver configured to receive a wireless receive signal from the remote wireless tunneling apparatus, the wireless receiver to downconvert the wireless receive signal to generate a baseband receive signal;
    a state machine configured to:
        receive a local identification signal indicating an initial local configuration of the local wireless tunneling apparatus through a wired connection, wherein the initial local configuration comprises one of (i) an upstream apparatus configuration, (ii) a downstream apparatus configuration, and (iii) an undetermined configuration,
        identify a remote identification signal in the baseband receive signal indicating an initial remote configuration of the remote wireless tunneling apparatus, and
        determine a resolved local configuration of the local wireless tunneling apparatus based on the initial local configuration of the local wireless tunneling apparatus and the initial remote configuration of the remote wireless tunneling apparatus; and
    a power supply providing output power to the local processing apparatus responsive to determining that the resolved local configuration of the local wireless tunneling apparatus is the downstream apparatus configuration, and to receive input power from the local processing apparatus responsive to determining that the resolved local configuration of the local wireless tunneling apparatus is the upstream apparatus configuration.

2. The local wireless tunneling apparatus of claim 1, wherein the state machine is further configured to determine that a conflict exists between the initial remote configuration of the remote wireless tunneling apparatus and the initial local configuration of the local wireless tunneling apparatus responsive to determining that the initial remote configuration of the remote wireless tunneling apparatus and the initial local configuration of the local wireless tunneling apparatus are both upstream apparatus configurations or both downstream apparatus configurations.

3. The local wireless tunneling apparatus of claim 2, wherein the state machine is further configured to at least partially disable the wireless receiver responsive to determining that the conflict exists between the initial remote configuration of the remote wireless tunneling apparatus and the initial local configuration of the local wireless tunneling apparatus.

4. The local wireless tunneling apparatus of claim 2, wherein responsive to determining that the conflict exists, the state machine is further configured to resolve the conflict by determining the resolved local configuration of the local wireless tunneling apparatus according to a package identification indicating a type of antenna coupled to the local wireless tunneling apparatus.

5. The local wireless tunneling apparatus of claim 2, wherein the state machine is further configured to determine the initial remote configuration of the remote wireless tunneling apparatus through a valid signal and the remote identification signal from the baseband receive signal, the valid signal indicating whether the remote identification signal is a valid indication of the initial remote configuration, and the remote identification signal indicating the initial remote configuration of the remote wireless tunneling apparatus responsive to the valid signal indicating the remote identification signal of the remote wireless tunneling apparatus is valid.

6. The local wireless tunneling apparatus of claim 5, wherein the state machine is further configured to determine the initial remote configuration of the remote wireless tunneling apparatus is undetermined responsive to the valid signal indicating the initial remote configuration of the remote wireless tunneling apparatus is not valid.

7. The local wireless tunneling apparatus of claim 1, wherein responsive to determining that the initial local configuration of the local wireless tunneling apparatus is the undetermined configuration:
- the state machine is further configured to determine that the resolved local configuration of the local wireless tunneling apparatus is the upstream apparatus configuration responsive to the initial remote configuration of the remote wireless tunneling apparatus being the downstream apparatus configuration,
- the state machine is further configured to determine that the resolved local configuration of the local wireless tunneling apparatus is the downstream apparatus configuration responsive to the initial remote configuration of the remote wireless tunneling apparatus being the upstream apparatus configuration, and
- the state machine is further configured to determine the resolved local configuration of the local wireless tunneling apparatus based on a package type responsive to the initial remote configuration of the remote wireless tunneling apparatus being the undetermined configuration.

8. The local wireless tunneling apparatus of claim 1, wherein responsive to determining that the initial remote configuration of the remote wireless tunneling apparatus is the undetermined configuration:
- the state machine is further configured to determine that a resolved remote configuration of the remote wireless tunneling apparatus is the upstream apparatus configuration responsive to the initial local configuration of the local wireless tunneling apparatus being the downstream apparatus configuration,
- the state machine is further configured to determine that the resolved remote configuration of the remote wireless tunneling apparatus is the downstream apparatus configuration responsive to the initial local configuration of the local wireless tunneling apparatus being the upstream apparatus configuration, and
- the state machine is further configured to determine the resolved remote configuration of the remote wireless tunneling apparatus based on a package type responsive to the initial local configuration of the local wireless tunneling apparatus being the undetermined configuration.

9. The local wireless tunneling apparatus of claim 1, further comprising:
- a wireless transmitter configured to transmit a wireless transmit signal indicating the initial local configuration of the local wireless tunneling apparatus to the remote wireless tunneling apparatus coupled to the remote processing apparatus.

10. The local wireless tunneling apparatus of claim 1, further comprising:
- a wireless transmitter configured to transmit a wireless transmit signal indicating the resolved local configuration of the local wireless tunneling apparatus to the remote wireless tunneling apparatus coupled to the remote processing apparatus.

11. The local wireless tunneling apparatus of claim 1, wherein the state machine is further configured to:
- determine that the local processing apparatus is coupled to the local wireless tunneling apparatus responsive to detecting the input power from the local processing apparatus, and
- determine that the local processing apparatus is decoupled from the local wireless tunneling apparatus responsive to not detecting the input power from the local processing apparatus.

12. The local wireless tunneling apparatus of claim 11, wherein responsive to determining that the resolved local configuration of the local wireless tunneling apparatus is the upstream apparatus configuration and responsive to determining that the local processing apparatus is coupled to the local wireless tunneling apparatus, the state machine is further configured to cause the power supply to receive the input power from the local processing apparatus.

13. The local wireless tunneling apparatus of claim 11, wherein responsive to determining that the resolved local configuration of the local wireless tunneling apparatus is the downstream apparatus configuration and responsive to determining that the local processing apparatus is coupled to the local wireless tunneling apparatus, the state machine is further configured to cause the power supply to provide the output power to the local processing apparatus.

14. A method for wirelessly tunneling communications between a local processing apparatus and a remote processing apparatus while being compliant with a wired communication protocol of the communications between the local processing apparatus and the remote processing apparatus, the method comprising:
- receiving, by a wireless receiver, a wireless receive signal from a remote wireless tunneling apparatus;
- downconverting, by the wireless receiver, the wireless receive signal to generate a baseband receive signal;
- receiving, by a state machine, a local identification signal indicating an initial local configuration of a local wireless tunneling apparatus through a wired connection, wherein the initial local configuration comprises one of (i) an upstream apparatus configuration, (ii) a downstream apparatus configuration, and (iii) an undetermined configuration;
- identifying, by the state machine, a remote identification signal in the baseband receive signal indicating an initial remote configuration of the remote wireless tunneling apparatus;
- determining, by the state machine, a resolved local configuration of the local wireless tunneling apparatus based on the initial local configuration of the local wireless tunneling apparatus and the initial remote configuration of the remote wireless tunneling apparatus;
- responsive to determining that the resolved local configuration of the local wireless tunneling apparatus is the downstream apparatus configuration, providing, by a power supply unit, output power to the local processing apparatus; and
- responsive to determining that the resolved local configuration of the local wireless tunneling apparatus is the upstream apparatus configuration, receiving, at the power supply unit, input power from the local processing apparatus.

15. The method of claim 14, further comprising:
- determining, by the state machine, that a conflict exists between the initial remote configuration of the remote wireless tunneling apparatus and the initial local configuration of the local wireless tunneling apparatus responsive to determining that the initial remote configuration of the remote wireless tunneling apparatus and the initial local configuration of the local wireless tunneling apparatus are both upstream apparatus configurations or both downstream apparatus configurations.

16. The method of claim 14, further comprising:

responsive to determining that the initial local configuration of the local wireless tunneling apparatus is the undetermined configuration:

determining, by the state machine, that the resolved local configuration of the local wireless tunneling apparatus is the upstream apparatus configuration responsive to the initial remote configuration of the remote wireless tunneling apparatus being the downstream apparatus configuration;

determining, by the state machine, that the resolved local configuration of the local wireless tunneling apparatus is the downstream apparatus configuration responsive to the initial remote configuration of the remote wireless tunneling apparatus being the upstream apparatus configuration; and determining, by the state machine, the resolved local configuration of the local wireless tunneling apparatus based on a package type responsive to the initial remote configuration of the remote wireless tunneling apparatus being the undetermined configuration.

17. The method of claim 14, further comprising:

responsive to determining that the initial remote configuration of the remote wireless tunneling apparatus is the undetermined configuration:

determining, by the state machine, that a resolved remote configuration of the remote wireless tunneling apparatus is the upstream apparatus configuration responsive to the initial local configuration of the local wireless tunneling apparatus being the downstream apparatus configuration; and determining, by the state machine, that the resolved remote configuration of the remote wireless tunneling apparatus is the downstream apparatus configuration responsive to the initial local configuration of the local wireless tunneling apparatus being the upstream apparatus configuration; and determining, by the state machine, the resolved local configuration of the remote wireless tunneling apparatus based on a package type responsive to the initial local configuration of the remote wireless tunneling apparatus being the undetermined configuration.

18. The method of claim 14, further comprising:

transmitting, by a wireless transmitter, a wireless transmit signal indicating the initial local configuration of the local wireless tunneling apparatus to the remote wireless tunneling apparatus coupled to the remote processing apparatus.

19. The method of claim 14, further comprising:

transmitting, by a wireless transmitter, a wireless transmit signal indicating the resolved local configuration of the local wireless tunneling apparatus to the remote wireless tunneling apparatus coupled to the remote processing apparatus.

20. The method of claim 14, further comprising:

determining, by the state machine, that the local processing apparatus is coupled to the local wireless tunneling apparatus responsive to detecting the input power from the local processing apparatus; and determining, by the state machine, that the local processing apparatus is decoupled from the local wireless tunneling apparatus responsive to not detecting the input power from the local processing apparatus.

* * * * *